(12) United States Patent
Felch et al.

(10) Patent No.: US 8,753,524 B2
(45) Date of Patent: Jun. 17, 2014

(54) COMPOSITE MEDIA FOR WATER TREATMENT PROCESSES AND METHODS OF USING SAME

(75) Inventors: Chad L. Felch, Mosinee, WI (US);
Matthew Patterson, Hatley, WI (US);
Shane Wiercinski, Wausau, WI (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/410,420

(22) Filed: Mar. 2, 2012

(65) Prior Publication Data

US 2012/0223020 A1 Sep. 6, 2012

Related U.S. Application Data

(60) Provisional application No. 61/448,821, filed on Mar. 3, 2011.

(51) Int. Cl.
| | | |
|---|---|---|
| B01D 17/02 | (2006.01) | |
| C02F 1/00 | (2006.01) | |
| B01D 15/04 | (2006.01) | |
| C02F 1/28 | (2006.01) | |
| B01D 21/26 | (2006.01) | |
| B01D 39/00 | (2006.01) | |
| B01D 39/14 | (2006.01) | |
| B01D 71/10 | (2006.01) | |
| B01D 17/04 | (2006.01) | |
| B01D 21/00 | (2006.01) | |
| B01D 15/00 | (2006.01) | |
| B01J 39/00 | (2006.01) | |
| C02F 1/42 | (2006.01) | |
| B01D 71/06 | (2006.01) | |

(52) U.S. Cl.
USPC ........... 210/799; 210/663; 210/693; 210/708; 210/739; 210/804; 210/500.27; 210/500.29; 210/DIG. 5

(58) Field of Classification Search
None
See application file for complete search history.

(56) References Cited

U.S. PATENT DOCUMENTS

| | | | | |
|---|---|---|---|---|
| 3,972,816 A | * | 8/1976 | Mail et al. | 210/259 |
| 4,231,768 A | | 11/1980 | Seibert et al. | |
| 4,707,269 A | * | 11/1987 | Ohue et al. | 210/651 |
| 5,882,517 A | | 3/1999 | Chen et al. | |
| 5,928,588 A | | 7/1999 | Chen et al. | |
| 6,969,740 B2 | * | 11/2005 | Klosiewicz | 525/211 |
| 2003/0047522 A1 | * | 3/2003 | Gannon et al. | 210/799 |
| 2006/0163177 A1 | * | 7/2006 | Johnson et al. | 210/799 |
| 2009/0178970 A1 | * | 7/2009 | Stanfel et al. | 210/500.26 |
| 2010/0145113 A1 | | 6/2010 | Bachman et al. | |
| 2010/0213104 A1 | * | 8/2010 | Hughes et al. | 208/293 |
| 2010/0292844 A1 | | 11/2010 | Wolf | |
| 2010/0319310 A1 | * | 12/2010 | Smith et al. | 55/527 |

FOREIGN PATENT DOCUMENTS

WO      WO 2004087286 A1 * 10/2004 ........... B01D 17/022

* cited by examiner

*Primary Examiner* — Nam Nguyen
*Assistant Examiner* — Clare Perrin

(57) ABSTRACT

Systems and methods for treating a stream comprising a hydrocarbon liquid and an aqueous-based liquid are provided. The systems and methods may utilize a media composite comprising a mixture of a cellulose-based material and a polymer. In certain systems and methods, the media composite is capable of being backwashed. The stream comprising the hydrocarbon liquid and aqueous-based liquid may be separated by contacting the stream with the media composite. In certain system and methods, the stream comprising the hydrocarbon liquid and aqueous-based liquid may be coalesced by contacting the stream with the media composite.

35 Claims, 8 Drawing Sheets

COMPOSITE MEDIA FOR WATER TREATMENT PROCESSES AND METHODS OF USING SAME

CROSS-REFERENCE TO RELATED APPLICATION

This application claims priority under 35 U.S.C. §119(e) to U.S. Provisional Application Ser. No. 61/448,821, titled, "USE OF BULK COMPOSITE MEDIA COMPOSED OF WOOD AND PLASTIC FOR THE REMOVAL OF OIL FROM WATER," filed Mar. 3, 2011, the entire disclosure of which is hereby incorporated by reference in its entirety.

FIELD OF THE TECHNOLOGY

Aspects relate generally to treatment of liquids and, more particularly, to methods for coalescing hydrocarbon liquids and separating hydrocarbon liquids from aqueous-based liquids.

SUMMARY

In accordance with one or more embodiments, a method for treating a feed stream comprising a hydrocarbon liquid and an aqueous-based liquid is provided. The method comprises introducing the feed stream to an inlet of a vessel containing a media composite, the media composite comprising a mixture of a cellulose-based material and a polymer, and contacting the feed stream with the media composite to produce a treated stream, the treated stream comprises a predetermined target concentration of the hydrocarbon liquid. In other aspects, the method further comprises measuring at least one property of the treated stream. In at least one aspect, the measured property is at least one of a concentration of hydrocarbon liquid in the treated stream and a flow rate of the treated stream. In at least one aspect, the method further comprises backwashing the media composite based on the at least one measured property of the treated stream to produce a hydrocarbon liquid effluent. In another aspect, the method further comprises recycling the hydrocarbon liquid effluent to the feed stream.

In one or more embodiments, contacting the feed stream with the media composite comprises filtering the feed stream, wherein the predetermined target concentration of hydrocarbon liquid of the treated stream is less than a concentration of hydrocarbon liquid in the feed stream. In another embodiment, the predetermined target concentration of hydrocarbon liquid in the treated stream is less than about 30 ppm. In certain aspects, contacting the feed stream with the media composite comprises coalescing the feed stream, wherein the predetermined target concentration of hydrocarbon liquid in the treated stream is a reduced concentration of an emulsified hydrocarbon liquid relative to the feed stream. In another embodiment, the concentration of emulsified hydrocarbon liquid in the treated stream is reduced relative to the feed stream by greater than about 50%. In certain aspects, the treated stream comprises hydrocarbon liquid droplets of at least about 20 microns in diameter.

In accordance with one or more embodiments, a method for treating a feed stream comprising a hydrocarbon liquid and an aqueous-based liquid is provided, comprising passing the feed stream at a first flux rate through a coalescer containing a media composite, the media composite comprising a mixture of a cellulose-based material and a polymer to produce a coalesced stream, and passing the coalesced stream at a second flux rate through a filter device in communication with the coalescer and containing the media composite to produce an effluent stream. In certain embodiments, the first flux rate is in a range of from about 100 to about 200 gpm/ft$^2$. In at least one embodiment, the second flux rate is less than about 40 gpm/ft$^2$. In another embodiment, the method further comprises maintaining a concentration of hydrocarbon liquid in the effluent stream at a predetermined target percent reduction. In at least one aspect, the method further comprises backwashing at least one of the coalescer and the filter device. In certain embodiments, the method further comprises backwashing the at least one of the coalescer and the filter device based on a predetermined time interval.

In one or more embodiments, the method further comprises measuring at least one property of the coalesced stream. Another embodiment comprises backwashing the coalescer based on the at least one measured property of the coalesced stream to produce a hydrocarbon liquid effluent. In certain aspects, the method the at least one measured property is a flow rate of the coalesced stream.

In certain aspects, the method comprises measuring at least one property of the effluent stream. In at least one aspect, the method further comprises backwashing the filter device based on the at least one measured property of the effluent stream to produce a hydrocarbon liquid effluent. In another aspect, the at least one measured property is at least one of a flow rate of the effluent stream and a concentration of hydrocarbon liquid in the effluent stream.

In accordance with one or more embodiments, a method is provided for treating a feed stream comprising a hydrocarbon liquid and an aqueous-based liquid comprising passing the feed stream through a coalescer containing a media composite comprising a mixture of a cellulose-based material and a polymer to produce a coalesced stream, the coalesced stream comprising a reduced concentration of an emulsified hydrocarbon liquid relative to the feed stream, and separating the coalesced stream by passing the coalesced stream through a separator device to provide at least one of a hydrocarbon liquid stream and an aqueous stream. In one aspect, the coalesced stream comprises hydrocarbon liquid droplets of at least about 20 microns in diameter. In a further aspect, the separator device comprises at least one of a hydrocyclone, a gravity settling device, a filter device and a flotation device.

In certain aspects, the method further comprises measuring at least one property of the coalesced stream. In at least one aspect, the method further comprises backwashing the coalescer based on the at least one measured property of the coalesced stream to produce a hydrocarbon liquid effluent. In another embodiment, the at least one measured property is a flow rate of the coalesced stream.

In accordance with one or more embodiments, a system for treating a feed stream comprising a hydrocarbon liquid and an aqueous-based liquid is provided comprising at least one coalescer in communication with the feed stream and containing a media composite comprising a mixture of a cellulose-based material and a polymer, and at least one separator device in communication with the coalescer. In at least one embodiment, the separator device is at least one of a filter device, a gravity settling device, a hydrocyclone, and a flotation device. In certain embodiments, the separator device is a filter device containing the media composite. In one or more embodiments, the media composite comprises a concentration of cellulose-based material of at least about 50% by weight. In one embodiment, the cellulose-based material comprises maple wood. In certain aspects, the polymer comprises high density polyethylene. In other aspects, the media composite comprises a plurality of uniformly shaped particles.

In accordance with one or more embodiments, a method of facilitating a treatment system for separating a hydrocarbon liquid and an aqueous-based liquid from a feed stream, the treatment system comprising at least one vessel in communication with the feed stream is provided, the method comprising providing a media composite comprising a mixture of a cellulose-based material and a polymer, and positioned in the vessel to be contacted with the feed stream.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
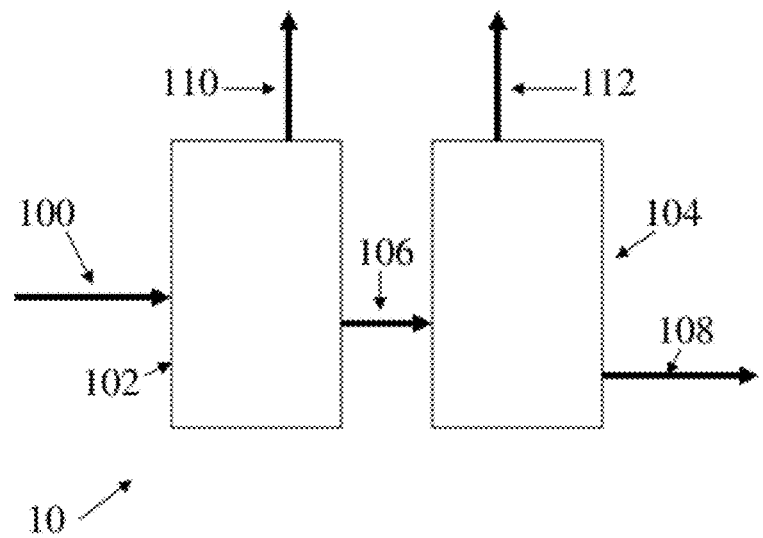
FIG. 1 is a schematic drawing of a process flow diagram in accordance with one or more aspects of the disclosure.

The modifier "about" as used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

In certain applications, individual components in liquids may be physically treated prior to their use in further processes. Physical treatments rely primarily on the physical properties of the individual components in the liquid and may include at least one of coalescing, separation, and filtration techniques. For example, aqueous liquids may comprise suspended solids or liquids that may be treated by one or more filtration, coalescing, and separation processes. One or more of these processes may include contacting the liquid with media. In certain instances, contacting the liquid with media may occur by passing the liquid through a bed packed with the media.

Media may be useful for a variety of processing techniques and applications, including filtering, coalescing, separating, increasing residence time of a liquid in a vessel containing the media, and functioning as an adsorbant or absorbent. For example, media may be used for separating liquids from gases, liquids from other liquids, and separating suspended solids, colloidal, and particulate matter from a fluid stream. In addition, media may be used to coalesce smaller droplets of one or more components in a liquid into larger droplets. For example, media filters may be used for the removal of suspended solids and free oil from one or more solutions. For instance, media filters may be used in oil refineries and oil wells, petrochemical plants, chemical plants, natural gas processing plants, and other industrial processes for purposes of oil and water separation. Separation techniques in these industrial processes may be categorized into primary, secondary and tertiary stages. Primary separation techniques may utilize, for example, API separators and gravity clarifiers to separate gross amounts of oil and suspended solids from wastewater effluents. In certain examples, primary separating techniques may reduce oil concentrations to about 500 to about 200 ppm. Secondary separation techniques may utilize, for example, coalescing and flotation devices to remove additional amounts of oil from wastewater. In certain examples, secondary separating techniques may reduce oil concentrations to about 100 to about 20 ppm. Tertiary separation techniques may utilize, for example, media bed filters, and may reduce oil concentrations to discharge limits. For example, tertiary treatment techniques may be capable of removing free oil from starting levels ranging from about 20 ppm to about 100 ppm down to levels that are below about 10 ppm. Non-limiting examples of tertiary separation techniques include API flotation devices, dissolved air flotation (DAF) devices, dissolved gas flotation (DGF) devices, compact flotation devices, hydrocyclones, and media bed filters, including walnut shell media bed filters, There is current demand for tertiary media filters on oil platforms (also referred to as "off shore") in order to comply with regulatory requirements on wastewater discharge. The footprint and weight of the equipment are critical factors in determining what equipment will be used on off-shore oil platforms. Consequently, a media that is more efficient in removing oil from water than that which is currently available may permit the size and weight of the equipment to be greatly reduced. The media filter may be located downstream from primary and secondary treatments. Currently, black walnut shell media is known for its affinity for both oil and water and may be used as media for in tertiary separation processes. For example, in oil refineries walnut shell filters are used downstream of primary separation techniques and secondary treatment techniques to remove the remaining about 20 to about 100 ppm of free oil to levels below about 10 ppm.

In certain embodiments of the disclosure, it may be desirable to provide an economical and low maintenance bulk media that may be capable of being backwashed. The backwashing may restore the media and enable it for re-use. In some embodiments, it may be desirable to provide a backwashable media that may include higher flux rate capabilities and more efficient oil removal when compared to black walnut shell media, for example, from the Eastern Black Walnut species (*Juglans nigra*). Walnut shell media filters may have a limited flux rate, which may limit the size of their construction, and consequently limit their feasibility for use on off-shore platforms. In addition, sources of black walnut shell media are susceptible to instability, since availability is directly dependent upon harvesting from season to season. In some embodiments, it may be desirable to reduce the frequency of backwashing to enhance the throughput of one or more treatment systems. This reduction may also reduce the volume of backwash water that may be produced, which may provide an additional advantage to the system.

In certain applications, individual components suspended in a liquid may be difficult to physically remove due to their size. For example, in oil drilling operations, water is usually produced containing crude oil. Regulatory requirements or process conditions may dictate that the water contain oil at a concentration below a certain threshold value before it may be discharged to the environment or recycled for other uses. The complexity of separating the mixture of oil and water may depend upon the physical form of the oil. During processing and transferring activities, pressure drops and shearing may create oil droplets that are small enough such that they are not easily separated from water. For instance, the oil may be dispersed throughout the water in small droplets, which may have diameters that are less than 20 microns. For oils that have a specific gravity close to that of water, droplets with diameters even larger than 20 microns may be difficult to remove by conventional gravity separation processes. In each of these types of mixtures, the oil is considered to be emulsified in the water. In certain aspects emulsified oil may be oil that will not separate from water after gravity separation is allowed to occur for about 30 minutes under quiescent conditions. Treating water that contains emulsified oil may present certain difficulties in terms of physical separation techniques. Technologies such as hydrocyclones, API separators, flotation devices, gravity settling devices, and walnut shell filters may be ineffective at removing mechanically emulsified oil from water. These technologies may instead be used for "free" oil, which is non-emulsified oil.

In accordance with one or more embodiments, the systems and methods described herein relate to a method for treating a feed stream. The feed stream may comprise one or more components. The feed stream may comprise one or more components that are in the same phase, for example, one or more liquids. The feed stream may comprise one or more components that are in different phases, for example, one or more gas and liquid combinations, and one or more solid and liquid combinations. In certain applications, the feed stream may comprise one or more suspended solids, colloids and particulate matter. The feed stream may comprise an aqueous-based liquid. In certain aspects, the feed stream may comprise a hydrocarbon liquid and an aqueous-based liquid. In certain aspects, the system may receive one or more feed streams from industrial sources. For example, the feed stream may originate from oil refineries, oil wells, petrochemical plants, chemical plants, natural gas processing plants, and other industrial processes. In certain embodiments, the system may receive one or more feed streams comprising a hydrocarbon liquid and an aqueous-based liquid. As used herein, the term "hydrocarbon" refers to organic material with molecular structures containing carbon bonded to hydrogen. Hydrocarbons may also include other elements, such as, but not limited to, at least one of halogens, metallic elements, nitrogen, oxygen, and sulfur. As used herein, the term "hydrocarbon liquid" refers to a liquid phase hydrocarbon fluid or to a mixture of liquid phase hydrocarbon fluids. The hydrocarbon liquid may comprise additional substances, for example, solid particles. Non-limiting examples of hydrocarbon liquids may include, for example, crude oil, natural gas, shale oil, pyrolysis oil, and any combination thereof. As used herein, the terms "aqueous-based liquid," and "aqueous stream" refer to liquids comprising water. The liquid may comprise additional substances, which may be solids, including suspended solids, liquids, gases, or any combination thereof. The methods and systems described herein may refer to a feed stream comprising a hydrocarbon liquid and an aqueous-based liquid, but should not be limited as such. For example, it may be possible to treat one or more other types of liquids according to the methods and systems described herein.

In certain embodiments, the feed stream may be introduced to an inlet of a vessel. The inlet may be positioned at the top of the vessel, the bottom of the vessel, or anywhere in between that is suitable for accomplishing the methods and systems described herein. As used herein, the term "vessel" broadly means any structure suitable for confining one or more process components, including gas, liquid and solid components and mixtures thereof. The vessel may be open to the environment or may be closed to operate under pressure. In certain applications, the vessel may be constructed to provide an anaerobic or aerobic environment for the components. The vessel may be sized and shaped according to a desired application and volume of feed to be treated to provide at least one of a desired throughput and a desired period of operation before a backwash is initiated. The vessel may have a bed to accommodate media at a desired depth based upon the desired volume of feed to be treated and the media selected for the particular application. Accordingly, the vessel may have any bed depth of media that is suitable for the purposes of the methods and systems described herein. The vessel may be constructed of any material suitable for the purposes of the methods and systems described herein. Non-limiting examples of suitable materials include steel, stainless steel, fiberglass reinforced plastic, and polyvinyl chloride (PVC). One or more embodiments may include a vessel having one or more sidewalls depending upon the desired shape of the vessel. For example a cylindrical vessel may have one sidewall while a square or rectangular vessel may have four side walls. In certain embodiments, the vessel may have a cylindrical shape having one continuous sidewall positioned between the first and second walls. In certain other embodiments, the vessel may be closed wherein one or more sidewalls extend between a first wall and a second wall. In certain aspects, the vessel may contain a media. Any media suitable for the methods and systems disclosed herein may be used. The media may be positioned in the vessel at a pre-selected depth and may fill the entire volume of the vessel or be contained in a particular portion of the vessel. For example, a portion of the volume of the vessel adjacent one or more walls may be free of media. Media may be contained within the vessel by one or more dividers, such as screens or perforated plates, which may retain the media in a desired location within the vessel while allowing one or more liquids to flow throughout the media in the vessel.

In certain embodiments the vessel may contain a media composite. As used herein, the term "media composite" refers to a combination of two or more different materials. In at least one embodiment, the media composite comprises a mixture of a cellulose-based material and a polymer. The media composite may comprise a heterogeneous mixture of a cellulose-based material and a polymer. The heterogeneous mixture may comprise the ingredients or constituents such that the components are not distributed uniformly throughout the mixture. As used herein, the term "heterogeneous mixture" refers to a composite of two or more dissimilar ingredients or constituents. The media composite may comprise a homogeneous mixture of a cellulose-based material and a polymer. In one embodiment, the media composite may comprise the cellulose-based material and polymer such that the two materials are secured to one another but are not mixed with one another. As used herein, the term "homogeneous mixture" refers to a composite that is a single-phase composite of two or more compounds that are distributed in a uniform ratio or in a substantially uniform ratio throughout the mixture so that any portion of the composite exhibits the same ratio of the two or more compounds. As used herein, the term "cellulose-based material" refers to any material, product, or composition which contains cellulose. Non-limiting examples may include wood from deciduous and evergreen trees, including wood powder, wood pulp, wood particles, wood fibers, sawdust, wood flakes, wood chips, and any other wood product or cellulose-based product suitable for the methods and systems disclosed herein, such as, coconut, bagasse, peat, pulp-mill waste, corn stalks, and any combination thereof. The media may comprise any wood suitable for the purposes of the methods and systems described herein. In certain embodiments, the cellulose-based material may be pine wood. In certain embodiments, the cellulose-based material may be maple wood. Non-limiting examples of polymers suitable for the methods and systems describe here may include polyolefins, including high density polyethylene (HDPE), polyethylene (PE), polypropylene (PP), PVC, ethylene propylene copolymers, fluoropolymers, including Teflon®, and any combination thereof. In at least one embodiment, the polymer may be HDPE. In another embodiment, the polymer may be polypropylene.

In one or more embodiments, the media composite may comprise a concentration of cellulose-based material of at least about 50%. In other embodiments, the media composite may comprise a concentration of cellulose-based material of at least about 60%. In certain embodiments, the media composite may comprise a concentration of cellulose-based material of at least about 70%. In at least one embodiment, the media composite may comprise a concentration of maple wood of about 50% by weight. In another embodiment, the media composite may comprise a concentration of pine wood of about 70% by weight. The concentration of cellulose-based material may be any percentage between about 0% and about 100%, or any range of percentages in between these percentages. In at least one aspect, the media composite comprises a plurality of uniformly shaped particles. As used herein, the term "uniformly shaped particles" refers to exactly the same shaped and size particles and substantially the same shaped and sized particles, while tolerating some degree of difference in shape attributable to, for example, manufacturing error. Suitable shapes for the media composite may include spheres and cylinders. For example, the media composite may comprise a plurality of uniformly shaped cylinder or cylinder-like shapes. The media composite may be of any shape that may allow for gaps in the interstitial area between the particles. In certain embodiments, the media composite may comprise a plurality of irregularly shaped particles.

The media composite may comprise additional components, including chemical components. Non-limiting examples of components that may be suitable to include in the media composite include coagulants and flocculants. The media composite may comprise any additional component that may be suitable for the purposes of the methods and systems described herein.

In accordance with certain embodiments, a media is provided. Any media may be used so long as it may be suitable for at least one of (1) coalescing at least one hydrocarbon liquid and (2) filtering at least one stream comprising a hydrocarbon liquid and an aqueous liquid. One example of a media suitable for the methods and systems described herein may be a media composite. As used herein, the terms "media composite" and "composite media" are used interchangeably. The media composite may comprise a mixture of a cellulose-based material and a polymer. The media may comprise at least one of a homogeneous and heterogeneous mixture of a cellulose-based material and polymer. The cellulose-based material and polymer may be characterized and incorporated as discussed above. In at least one embodiment, the media may be capable of being backwashed. In certain embodiments, the media may be capable of being fluidized. In some embodiments, the media may exhibit at least one of adsorbing and absorbing properties toward at least one of the hydrocarbon liquid and the aqueous liquid.

In certain embodiments, the mass of oil that may be loaded onto the media composite before breakthrough occurs may be four times the mass that may be loaded onto other types of media materials. The other types of media materials may include, for example, wood, polymer (for example HDPE and polypropylene), and black walnut shells. In at least one embodiment, the wood and polymer components of the media composite may fail to exhibit an oil loading capacity at or near the level of the oil loading capacity of the media composite. Without being bound by theory, one possible explanation for the beneficial effects of the combination of wood and polymer may be that the two components each offer different adsorption or absorption properties and that a synergy may be afforded by the combination of the two materials. A second possible explanation may be that the shape of the composite particles contributes toward the separation process.

In certain embodiments, the vessel may also include a feed inlet positioned above the media and a filtrate outlet positioned below the media. The vessel may also include a first inlet that is constructed and arranged to deliver a first fluid to a first end of a draft tube to induce during backwash a flow of the media within the draft tube from the first end of the draft tube to a second end of the draft tube while inducing flow of the filter media along an outside sidewall of the draft tube from the second end of the draft tube to the first end of the draft tube. Draft tubes are discussed in further detail below.

In certain embodiments, the media composite contacts the feed stream to produce a treated stream. In at least one embodiment contacting the feed stream with the media composite comprises filtering the feed stream. As used herein, the terms "filtering" and "separating" broadly refer to any process used to separate a constituent of a substance from other constituents of the substance. For example, filtering may refer to a process for separating one or more phases from each other. In certain aspects, filtering may separate two liquid phases. In other aspects, filtering may separate a solid from a liquid phase. In at least one embodiment, filtering refers to a process for separating a hydrocarbon liquid from an aqueous-based liquid. In certain aspects, filtering comprises passing a feed stream through a filter device at a flux rate that may be less than about 40 gpm/ft$^2$. In other aspects, filtering comprises passing a feed stream through a filter device at a flux rate that may be less than about 30 gpm/ft$^2$. In at least one aspect, filtering comprises passing a feed stream through a filter device at a flux rate that may be less than about 20 gpm/ft$^2$. In another aspect, the flux rate may be less than about 13.5 gpm/ft$^2$. The flux rate may be any flux rate in between about 1 and about 1000 gpm/ft$^2$, or any range of flux rates in between these flux rates. The flux rate may be any rate that is suitable for the purposes of performing a filtering function as described in the methods and systems disclosed herein.

As used herein, the terms "filter device" and "separator device" refer to any device suitable for performing filtering processes. In certain embodiments, the filter device and separator device may be constructed and arranged as discussed above in reference to the vessel. The filter device and separator device may be constructed of any material suitable for the particular purposes of the methods and systems described herein. For example, the filter device and separator device may be constructed from any suitable construction material, for example, steel, stainless steel, fiberglass reinforced plastic, and PVC material, to form a tube or column structure. In at least one aspect, the filter device and separator device may comprise a media composite. At least one aspect includes a filter device containing a screen material fitted on at least one end of the filter device, for purposes of retaining media. In certain aspects, the direction of fluid flow through the filter device and separator device may be from top-to-bottom. In other aspects, the direction of fluid flow through the filter device and separator device may be from bottom-to-top. In certain embodiments, one or more filter devices and one or more separators may be positioned downstream from one or more coalescers.

In other aspects, contacting the feed stream with the media composite comprises coalescing the feed stream. As used herein, the term "coalescing" broadly refers to the combining and/or uniting of one or more smaller droplets of a liquid or other phase to form at least one of a larger droplet, a phase, and a layer. For example, in certain aspects, coalescing may increase the droplet size of a hydrocarbon liquid from a diameter of less than about 20 microns to a size that is greater than about 20 microns. In certain other aspects, coalescing may increase the droplet size of a hydrocarbon liquid from a diameter of less than about 20 microns to a size that is greater than about 50 microns. In some aspects, coalescing may produce a droplet size of a hydrocarbon liquid that is greater than about 50 microns. In some aspects, coalescing may produce a droplet size of a hydrocarbon liquid that may be greater than about 100 microns. As used herein, the term "coalesced stream" refers to a liquid where the droplets of a liquid or other phase form a droplet of at least about 20 microns in diameter. In at least one aspect, a coalesced stream may refer to a liquid where the droplets of hydrocarbon liquid are at least about 20 microns in diameter. In some aspects, the coalesced stream may refer to a liquid where the droplets of hydrocarbon liquid are at least about 20 microns in diameter, at least about 30 microns in diameter, at least about 30 microns in diameter, at least about 100 microns in diameter, and any combination thereof. In at least one aspect, coalescing comprises passing a feed stream through a coalescer at a flux rate that may be in a range of from about 40 to about 250 gpm/ft$^2$. In another aspect, coalescing comprises passing a feed stream through a coalescer at a flux rate that may be in a range of from about 100 to about 200 gpm/ft$^2$. The flux rate may be any flux rate in between about 1 and about 2000 gpm/ft$^2$, or any range of flux rates in between these flux rates. The flux rate may be any rate that is suitable for the purposes of performing a coalescing function as described in the methods and systems disclosed herein.

As used herein, the term "coalescer" refers to any device suitable for performing coalescing processes. In certain aspects, the coalescer may be constructed and arranged as discussed above in reference to the vessel. The coalescer may be constructed of any material suitable for the particular purposes of the methods and systems described herein. In certain embodiments, the coalescer may be constructed, for example, from any one or more of steel, stainless steel, fiberglass reinforced plastic, and PVC material, to form a tube or column structure. In at least one aspect, the coalescer may comprise a media composite. Some aspects includes a coalescer containing a screen material fitted on at least one end of the coalescer, for purposes of retaining media. In at least one aspect, the direction of fluid flow through the coalescer may be from top-to-bottom. In another aspect, the direction of fluid flow through the coalescer may be from bottom-to-top. In certain embodiments, one or more coalescers may be positioned upstream from one or more filter devices. In other embodiments, one or more coalescers may be positioned upstream from one or more separator devices.

In certain aspects, at least one of a coalescer and filter device may contain a media composite. The media composite may be partially or fully coated with a hydrocarbon liquid. The media composite may be at least partially or fully coated with the hydrocarbon liquid during one or more treatment processes, including backwash procedures, filtering, and coalescing. In certain examples, one or more coalescers may contain media composite that may be partially coated with hydrocarbon liquid. In some examples, one or more coalescers may contain media composite that may be saturated with hydrocarbon liquid. As used herein, the term "saturated," when used in reference to the media composite, refers to any degree of coating the media composite with hydrocarbon liquid wherein coalescing may be adequately performed. In other examples, one or more filter devices may contain a media composite that is non-saturated with hydrocarbon liquid. As used herein, the term "non-saturated," when used in reference to the media composite, refers to any degree of coating the media composite wherein filtering may be adequately performed. In certain aspects, one or more filter devices may contain media composite that may be substantially free of a coating of hydrocarbon liquid. In at least one embodiment, the media composite in a coalescer may be saturated with a hydrocarbon liquid and the media composite in a filter device may be non-saturated with a hydrocarbon liquid.

In accordance with certain methods and systems described herein, a treatment system is provided wherein one or more vessels may be capable of functioning as at least one of a coalescer and a filter device during one or more treatment processes. For example, a vessel containing media composite may function as a filter device until the media composite becomes saturated with hydrocarbon liquid, at which point it may function as a coalescer. In other examples, a treatment system may be provided comprising a first vessel containing media composite that may be positioned upstream from a second vessel comprising media composite. The first vessel may function as a coalescer and the second vessel may function as a filter device until the media composite in the second vessel becomes saturated with oil. The first vessel may be backwashed, and the flow through the treatment system may be directed so that the second vessel is positioned upstream from the first vessel. The second vessel may then function as a coalescer and the first vessel may function as a filter device until the media composite in the first device becomes saturated with oil. The second vessel may then be backwashed, and the flow through the treatment system may be directed so that the first vessel may be positioned upstream from the second vessel. The treatment system may comprise one or more vessels that may be used separately or together in at least one of a series, parallel, and any other configuration to produce one or more desired effluents. In certain examples, the treatment system may further comprise one or more additional separators. The one or more additional separators may be positioned upstream or downstream from the one or more vessels. The treatment system may be positioned upstream or downstream from at least one of a primary, secondary, primary, or tertiary process, and may be positioned as a stand-alone system or process or may be positioned in another system or process.

In accordance with the methods and systems described herein, one or more coalescer and filter devices may be used separately or together in at least one of a series, parallel, and any other configuration to produce one or more desired effluents. In certain embodiments, one or more filter devices may be in series configuration with one or more parallel trains comprising one or more filter devices in series configuration. In certain aspects, one or more filter devices may be placed in a first series configuration in parallel with a second series configuration. In certain embodiments, a first series configuration may be in parallel with a second series configuration that is further in parallel with a third series configuration and may also be in parallel with one or more additional series configurations. In at least one aspect, the first series may be configured to treat 100% of the incoming feed, while the second series is recharged or off-line. In at least one embodiment, a first set of four filter devices may be placed in a series configuration in parallel with a second set of four filter devices placed in a series configuration. In a similar fashion, in certain embodiments a first combination of at least one coalescer and at least one filter device may be placed in a series configuration in parallel with a second combination of at least one coalescer and at least one filter device in a series configuration. In another aspect, the first series and the second series may be configured to treat 100% of the incoming feed. In yet another aspect, the first series and the second series may be configured to treat 50% of the incoming feed. In some aspects, multiple series may be configured to treat a predetermined percentage of the incoming feed, for example, from about 1% to about 100% of the incoming feed, including any percentage in between these percentages or any range of percentages in between these percentages.

In certain aspects, one or more filter devices may be placed upstream or downstream from one or more coalescers. In other aspects, one or more coalescers may be placed upstream or downstream from one or more filter devices. In accordance with certain aspects, one or more filter devices, coalescers, and any combination thereof, may be placed downstream of at least one of a primary, secondary, or tertiary treatment process as described herein. In a further aspect, one or more filter devices, coalescers, or any combination thereof, may be placed upstream of at least one of a secondary or tertiary treatment process as described herein. One or more filter devices, coalescers, or any combination thereof, may be positioned anywhere in another system or process to produce a desired effluent.

In certain aspects, the media composite may be used in structures, systems, and processes that may not comprise a stand-alone vessel containing the media composite. For example, the media composite may be placed in a structure to perform, for example, filtering or coalescing, and that structure may be placed at least partially within another vessel that may or may not contain media, and may be used for another purpose other than filtering and coalescing. The structure that the media is placed in may be a sub-compartment of the vessel, a pipe, or other conduit that may be used in conjunction with the vessel and a larger system. In certain embodiments, the vessel may be used for at least one of filtering and coalescing, and may be used in conjunction with the media placed in the structure to achieve a desired result.

In accordance with one or more embodiments, the media composite may be capable of functioning as both an emulsified oil coalescer as well as a free oil filter. The flow rate through a vessel containing the media composite may dictate how the media and vessel combination perform. In certain embodiments, a high flux rate, for example, greater than about 100 gpm /ft$^2$, may promote oil coalescing, and a low flux rate, for example, less than about 30 gpm /ft$^2$, may allow the vessel to function as a filter device. In at least one aspect, coalescing comprises passing a feed stream through a coalescer at a flux rate that may be in a range of from about 40 to about 250 gpm/ft$^2$. In another aspect, coalescing comprises passing a feed stream through a coalescer at a flux rate that may be in a range of from about 100 to about 200 gpm/ft$^2$. In certain aspects, filtering comprises passing a feed stream through a filter device at a flux rate that may be less than about 40 gpm/ft$^2$. In other aspects, filtering comprises passing a feed stream through a filter device at a flux rate that may be less than about 30 gpm/ft$^2$. In at least one aspect, filtering comprises passing a feed stream through a filter device at a flux rate that may be less than about 20 gpm/ft$^2$. In certain embodiments, placing the coalescer and filter device in a series configuration may allow for emulsified oil in water to be separated from a feed stream.

In certain aspects, at least one of the filter device and the coalescer may be fitted with a draft tube system. The draft tube system may comprise one or more draft tubes and may be constructed and arranged to intermittently backwash the media by providing a desired volume and/or velocity of backwash fluid to roll the bed. As used herein, "rolling the bed" is defined as the movement of the media during backwash in which the media at or near the second wall of the vessel may be partially or completely moved through the draft tube system toward the first wall of the vessel and back toward the second wall of the vessel. Alternatively, or in addition, the draft tube system may be used during at least one of the filtering and coalescing processes. Backwashing may be performed with a draft tube system in place, or may be performed without a draft tube system. The draft tube system may be sized and shaped to provide for at least one of a desired volume of media to be backwashed and to operate within a preselected time period for backwash operation. The draft tube system may comprise one or more draft tubes positioned in the media. As used herein, a "draft tube" is a structure having one or more sidewalls open at both ends which, when positioned in the media, provides a passageway for flow of media during backwash. In certain embodiments, the vessel may have a volume of media that is about 4 to about 6 times the volume of a draft tube or the summation of the volumes of the draft tubes in the draft tube system.

The draft tube may be constructed of any material suitable for the particular purposes of the methods and systems described herein. For example, the draft tube may be formed of the same material as the vessel, or may be formed of lighter, heavier, more expensive, or less expensive materials. For example, the draft tube may be formed of plastics, including fiberglass reinforced plastics. The draft tube may be preformed for insertion into the vessel or manufactured as part of the vessel. As such, the draft tube may be designed to retrofit current filtration and coalescer devices. The draft tube system may be supported on the second wall of the vessel. Alternatively, the draft tube system may be supported on a divider or media retention plate, such as a screen or perforated plate, designed to retain the media within a region of the vessel while allowing the flow of liquid and contaminants into and out of the media.

An individual draft tube may be sized and shaped according to at least one of a desired application, a volume of media to be backwashed, and to operate within a preselected time period for backwash operation. The draft tube may also be sized and shaped to provide suitable movement or lifting of the media during filtering or coalescing. The draft tube may also be sized and shaped to provide a desired level of agitation within the draft tube to partially or completely scrub the media, thereby releasing at least one of a portion of oil and suspended solids from the media. The desired draft tube system volume may be provided by a single draft tube or by multiple draft tubes having a total volume substantially equal to the desired volume. An individual draft tube may have a cross sectional area of any shape, such as circular, elliptical, square, rectangle, or any irregular shape. The individual draft tube may have any overall shape, such as conical, rectangular and cylindrical. In one embodiment, the draft tube is a cylinder. The draft tube may be positioned in the media so as to be entirely enveloped by the media as well as to be entirely filled with the media. One or both ends of the draft tube may be constructed and arranged to assist with at least one of the flow of media into and out of the draft tube. For example, the side wall at a first end of the draft tube may include one or more cutouts forming passageways to allow some of the media at or near the first end of the draft tube to enter through the sidewall of the draft tube. The cutouts forming the passageways may have any shape to allow a sufficient volume of media to enter the draft tube. For example, cutouts may be triangular, square, semicircular, or have an irregular shape. Multiple passageways may be identical to one another and uniformly positioned about the first end of the draft tube to equally distribute flow of media in the draft tube. The draft tube may also be open at the bottom, and may or may not contain additional cutouts.

The draft tube or draft tubes may be positioned at any suitable location within the media. For example, a single draft tube may, but need not, be positioned centrally in relation to the vessel sidewalls. Similarly, multiple draft tubes in a single vessel may be randomly positioned or positioned in a uniform pattern in relation to the vessel sidewalls. In one embodiment, a single draft tube is positioned in the media in relation to the vessel so that an axis extending from each end of the draft tube is co-axial with an axis parallel to the sidewall of the vessel. Multiple draft tubes in a single vessel may, but need not, be identical in volume or cross sectional area. For example, a single vessel may comprise cylindrical, conical and rectangular draft tubes of varying height and cross sectional area. In one embodiment, a vessel may have a first draft tube centrally positioned having a first cross sectional area and a plurality of second draft tubes positioned adjacent the side wall of the vessel in which each of the second draft tubes has a second cross sectional area smaller than the first cross sectional area. In another embodiment, a vessel has a plurality of identical draft tubes.

In another embodiment, the draft tube may include a baffle to prevent or reduce backflow within the draft tube. The baffle may have any size and shape suitable for a particular draft tube. For example the baffle may be a plate suitably positioned on an inner surface of the draft tube or a cylinder positioned in the draft tube. In one embodiment, the baffle may be a solid or hollow cylinder centrally positioned within the draft tube.

In at least one aspect, contacting the feed stream with the media composite produces a treated stream comprising a predetermined target concentration of hydrocarbon liquid. In another aspect, contacting the media composite comprises filtering the feed stream, wherein the predetermined target concentration of hydrocarbon liquid in the treated stream may be less than a concentration of hydrocarbon liquid in the feed stream. In certain embodiments, the predetermined target concentration of hydrocarbon liquid in the treated stream may be less than about 10 ppm. In other embodiments, the predetermined target concentration of hydrocarbon liquid in the treated stream may be less than about 5 ppm. In some embodiments, the predetermined target concentration of hydrocarbon liquid in the treated stream may be less than about 30 ppm. The target concentration may be any target concentration that complies with one or more regulatory requirements directed toward discharge concentrations. For example, the target concentration may be any target concentration in between about 0 ppm to about 200 ppm, or any range of target concentrations in between these target concentrations.

In accordance with one or more embodiments, contacting the feed stream with the media composite produces a treated stream comprising a predetermined target percent reduction of hydrocarbon liquid in the feed stream. For example, in certain aspects, a predetermined target percent reduction of hydrocarbon liquid may be greater than about 40%, greater than about 50%, greater than about 60%, greater than about 70%, greater than about 80%, greater than about 90%, greater than about 95%, greater than about 98%, and greater than about 99%. The target percent reduction may be any percentage in between these percentages or any range of percentages in between these percentages.

In accordance with certain embodiments, contacting the feed stream with the media composite may comprise coalescing the feed stream, wherein the predetermined target concentration of hydrocarbon liquid in the treated stream may be a reduced concentration of emulsified hydrocarbon liquid relative to the feed stream. As used herein, the term "emulsified hydrocarbon liquid" refers to a hydrocarbon liquid that contains hydrocarbon liquid droplets that are smaller than about 20 microns in diameter. In certain aspects, the treated stream may comprise a concentration of emulsified hydrocarbon liquid that is less than about 35 ppm. In other aspects, the feed stream may comprise a concentration of emulsified hydrocarbon liquid that is greater than about 40 ppm.

In certain embodiments, the feed stream may comprise hydrocarbon liquid, wherein greater than about 50% of the hydrocarbon liquid is emulsified hydrocarbon liquid by weight. In at least one aspect, the concentration of emulsified hydrocarbon liquid in the treated or coalesced stream is reduced relative to the feed stream by greater than about 50%. In at least one embodiment, the feed stream may comprise hydrocarbon liquid, wherein greater than about 60% of the hydrocarbon liquid is emulsified hydrocarbon liquid. In other embodiments, the feed stream may comprise hydrocarbon liquid, wherein greater than about 75% of the hydrocarbon liquid is emulsified hydrocarbon liquid. The feed stream may comprise hydrocarbon liquid, wherein about 0% to about 100% of the hydrocarbon liquid is emulsified hydrocarbon liquid. In certain aspects, the coalesced stream may comprise hydrocarbon liquid, wherein less than about 10% of the hydrocarbon liquid is emulsified hydrocarbon liquid. In at least one aspect, the coalesced stream may comprise hydrocarbon liquid, wherein less than about 5% of the hydrocarbon liquid is emulsified hydrocarbon liquid. The coalesced stream may comprise hydrocarbon liquid, wherein about 0% to about 100% of the hydrocarbon liquid is emulsified hydrocarbon liquid.

In certain aspects, the method for treating a feed stream may further comprise measuring at least one property of the treated stream. In at least one aspect, the at least one measured property may be a concentration of hydrocarbon liquid in the treated stream. In other aspects, the at least one measured property may be a flux rate of the treated stream. In another aspect, the at least one measured property may be a flow rate of the treated stream. In accordance with certain embodiments, the method for treating a feed stream may further comprise backwashing the media composite based on measuring at least one property of the treated stream to produce a hydrocarbon liquid effluent. As used herein, the term "hydrocarbon liquid effluent" refers to a liquid that comprises hydrocarbon liquid. In certain aspects, backwashing the media composite may be triggered, commenced, or based on a measurement of the concentration of hydrocarbon liquid in the treated stream, which may trigger or commence a backwashing step. In at least one aspect, backwashing the media composite may be based on a concentration of hydrocarbon liquid in the treated stream of greater than about 10 ppm. In another aspect, backwashing the media composite may be based on a concentration of hydrocarbon liquid in the treated stream of greater than about 30 ppm. Backwashing may function to restore the functionality of the media composite. In at least one aspect, the method for treating a feed stream may further comprise recycling the hydrocarbon liquid effluent to the feed stream. In some aspects, the method may further comprise transferring the hydrocarbon liquid effluent to one or more primary separation processes. In at least one aspect, the one or more primary separation processes may be positioned upstream from the treatment system. In other aspects, the one or more primary separation processes may be positioned downstream from the treatment system. The hydrocarbon liquid effluent may be transferred to any one or more processes that are suitable for performing the methods and systems described herein.

In accordance with certain embodiments, a method is provided for treating a feed stream comprising a hydrocarbon liquid and an aqueous-based liquid comprising passing the feed stream at a first flux rate through a coalescer containing the media composite to produce a coalesced stream. In at least one aspect, the method may further comprise passing the coalesced stream at a second flux rate through a filter device in communication with the coalescer and containing the media composite to produce an effluent stream. The feed stream, coalescer, media composite, coalesced stream, filter device, flux rates, and effluent stream may be provided and characterized as discussed above. In certain aspects, the method may further comprise maintaining a concentration of hydrocarbon liquid in the effluent stream. In another aspect, the concentration of hydrocarbon liquid in the effluent stream may be maintained at a predetermined target percent reduction. In at least one aspect, the concentration of hydrocarbon liquid in the effluent stream may be maintained at a value of less than about 10 ppm. In other aspects, the method may further comprise backwashing at least one of the coalescer and the filter device. In some aspects, the method may further comprise backwashing at least one of the coalescer and the filter device based on a predetermined time interval. In one embodiment, the predetermined time interval may be about 4 hours. In certain embodiments, the predetermined time interval may be about 6 hours, about 8 hours, about 12 hours, or about 24 hours. The predetermined time interval may be any interval in between these intervals, or any range of intervals in between these intervals. The predetermined time interval may be any time interval that is suitable for performing the methods and systems described herein.

In at least one aspect, the method may further comprise measuring at least one property of the coalesced stream. The at least one measured property may be at least one of a flow rate, a flux rate, and a concentration of one or more components of the coalesced stream. In certain aspects, the method may further comprise backwashing the coalescer. In certain aspects, the method may further comprise backwashing the coalescer based on the at least one measured property of the coalesced stream. In one aspect, the method may further comprise backwashing the coalescer based on the at least one measured property of the coalesced stream to produce a hydrocarbon liquid effluent.

In another aspect, the method may further comprise measuring at least one property of the effluent stream. In certain aspects, the at least one measured property may be at least one of a flow rate, a flux rate, and a concentration of one or more components of the effluent stream. In other aspects, the at least one measured property may be a concentration of hydrocarbon liquid in the effluent stream. In certain aspects, the method may further comprise backwashing the filter device. In one aspect, the method may further comprise backwashing the filter device based on the at least one measured property of the effluent stream. In one embodiment, the method may further comprise backwashing the filter device based on the at least one measured property of the effluent stream to produce a hydrocarbon liquid effluent.

Backwashing the media composite may be based on additional performance characteristics of the treatment system. For example, in certain aspects, backwashing the media composite may be based on a pressure drop across at least one of a coalescer and a filter device. For example, a sensor may generate a signal indicating that the pressure drop over a media bed in at least one of the coalescer and filter device has reached a predetermined value. This may trigger a controller to interrupt or otherwise intercept one or more flows in the treatment system to initiate a backwash procedure.

In accordance with certain embodiments, a method is provided for treating a feed stream comprising a hydrocarbon liquid and an aqueous-based liquid, comprising passing the feed stream through a coalescer containing a media composite comprising a mixture of a cellulose-based material and a polymer to produce a coalesced stream. The feed stream, coalescer, media composite, and coalesced stream may be provided and characterized as discussed above. In at least one embodiment, the coalesced stream may comprise a reduced concentration of an emulsified hydrocarbon liquid relative to the feed stream. For example, in certain aspects, a reduced percentage of emulsified hydrocarbon liquid may be greater than about 10%, greater than about 20%, greater than about 30%, greater than about 40%, greater than about 50%, greater than about 60%, greater than about 70%, greater than about 80%, greater than about 90%, greater than about 95%, greater than about 98%, and greater than about 99%. The reduced percentage may be any percentage in between these percentages or any range of percentages in between these percentages.

In certain aspects, the method may further comprise passing the coalesced stream through a separator device to provide at least one of a hydrocarbon liquid stream and an aqueous stream. The hydrocarbon liquid stream, aqueous stream, and separator device may be provided and characterized as previously discussed. In at least one aspect, the coalesced stream may comprise hydrocarbon liquid droplets of at least about 20 microns in diameter. In at least one aspect, the coalesced stream may comprise hydrocarbon liquid droplets of at least about 50 microns in diameter. In at least one aspect, the separator device may comprise at least one of a hydrocyclone, a filter device, a gravity settling device, and a flotation device. In certain embodiments, separating the coalesced stream into a hydrocarbon liquid stream and an aqueous stream may comprise passing the coalesced stream through at least one of a hydrocyclone device, a filter device, a gravity settling device, and a flotation device. Suitable hydrocyclones may include any model or type that perform according to the methods and systems described herein. The hydrocyclone may include an inline static mixer to enhance or create a cyclonic flow pattern. Suitable flotation devices may include any model or type that perform according to the methods and systems described herein. Non-limiting examples of flotation devices include API, DAF, DGF, and compact flotation devices. Other examples of separator devices that are suitable for the purposes of this disclosure include corrugated plate interceptors (CPI). In certain embodiments, separating may comprise passing the coalesced stream through a filter device, as discussed throughout the disclosure.

In accordance with certain aspects, the method may further comprise measuring at least one property of the coalesced stream. In another aspect, the method may further comprise backwashing the coalescer based on the at least one measured property of the coalesced stream to produce a hydrocarbon liquid effluent. Measuring at least one property of the coalesced stream and backwashing may be provided and characterized as previously discussed.

In certain non-limiting embodiments, a system may be provided for treating a feed stream comprising a hydrocarbon liquid and an aqueous-based liquid. The hydrocarbon liquid and aqueous-based liquid may be provided and characterized as previously discussed. In at least one embodiment, the system may further comprise at least one coalescer in communication with the feed stream. In certain aspects, the at least one coalescer may contain a media composite comprising a mixture of a cellulose-based material and a polymer. The coalescer and media composite may be provided and characterized as previously discussed. In certain embodiments, the system may further comprise at least one separator device in communication with the coalescer. The separator device may be provided and characterized as previously discussed.

In accordance with certain aspects, a method of facilitating may be provided. The method may provide facilitating a treatment system. The method may facilitate one or more parts of a pre-existing treatment system. The method may facilitate a stand-alone treatment system. In certain embodiments, the method may facilitate a treatment system for separating. In certain other embodiments, the method may facilitate a treatment system for coalescing. In certain aspects, the method may facilitate a treatment system for at least one of coalescing and separating. The method may facilitate a treatment system for separating a hydrocarbon liquid and an aqueous-based liquid from a feed stream. The method may facilitate a treatment system for coalescing a feed stream. The treatment system may comprise at least one vessel. The method of facilitating may comprise providing a media composite comprising a mixture of a cellulose-based material and a polymer, and positioned in the vessel to be contacted with the feed stream.

FIG. 1 illustrates a schematic flow diagram of a treatment system according to one or more embodiments of the methods and systems described herein. Treatment system 10 includes feed stream 100. Treatment system 10 may comprise one or more vessels. In accordance with certain embodiments, the one or more vessels may be a coalescer 102 and a filter device 104. Filter device 104 may be in communication and positioned downstream from coalescer 102. As discussed above, feed stream 100 may pass through coalescer 102 to produce a coalesced stream 106. As discussed above, coalesced stream may then be passed through filter device 104 to produce treated stream 108. In accordance with the previous discussion, during backwashing operations, at least one of coalescer 102 and filter device 104 may produce hydrocarbon effluent 110 and 112 respectively. Treatment system 10 may further comprise one or more pumps or valves for passing at least one of streams 100, 106, 108, 110, and 112 through the system.

Figure 2:
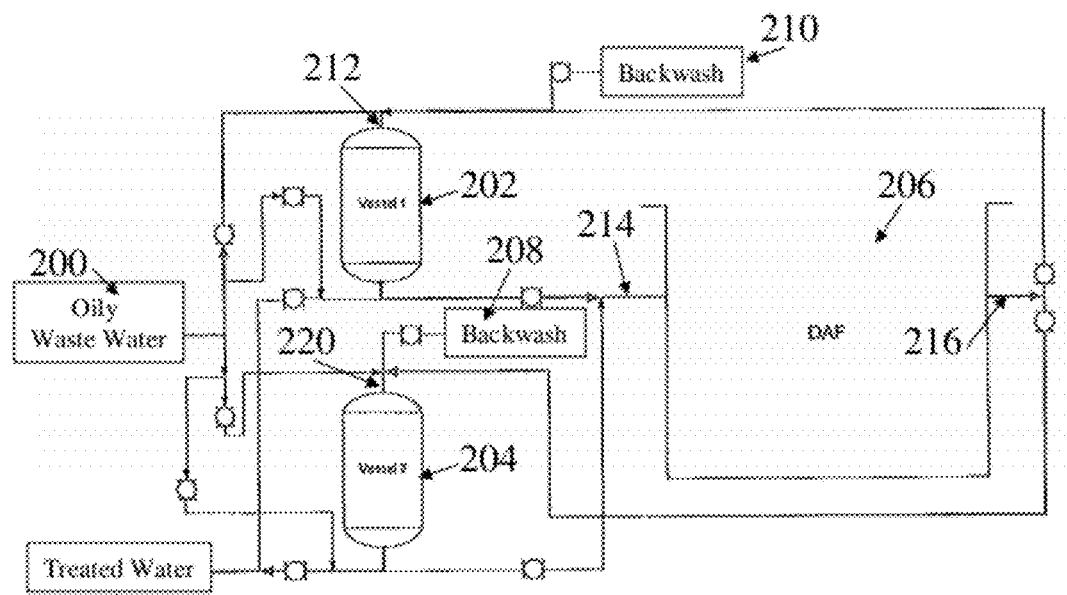
FIG. 2 is a schematic drawing of a process flow diagram in accordance with one or more aspects of the disclosure.

FIG. 2 illustrates a schematic flow diagram of a treatment system according to one or more embodiments of the methods and systems described herein. Treatment system 20 includes feed stream 200 comprising oily waste water. Feed stream 200 may first be passed as inlet stream 212 through vessel 202, where at least some portion of the oil in the waste water may be coalesced into larger droplets. Vessels 202 and 204 may be in communication with a Dissolved Air Flotation device (DAF) 206. The coalesced effluent exiting vessel 202 may then be introduced as coalesced stream 214 to DAF device 206, where larger oil droplets are removed. The effluent 216 from DAF device 206 may then be passed as inlet stream 220 through vessel 204, where the remaining oil may be filtered out to produce treated water stream 218.

Treatment system 20 may be constructed and arranged so that when vessel 204 becomes saturated with oil, vessel 202 may be backwashed using backwash source 210. Once vessel 202 is backwashed, feed stream 200 may first be passed as inlet stream 220 through vessel 204, where at least some portion of the oil in the waste water may be coalesced. The coalesced effluent exiting vessel 204 may then be introduced as coalesced stream 214 to DAF device 206 to produce effluent 216. Effluent 216 may then be passed as inlet stream 212 through vessel 202, where the remaining oil may be filtered out to produce treated water stream 218.

In a similar manner, once vessel 202 becomes saturated with oil, vessel 204 may be backwashed using backwash source 208. Once vessel 204 is backwashed, feed stream 200 may pass as inlet stream 212 through vessel 202, and the process and cycle as described above is repeated. At least one advantages of using treatment system 20 includes the flexible process flow, which allows for the continual presence of a vessel saturated with oil that may function as a coalescing device. This may result in an increase in overall performance of the system, and may reduce costs associated with removing oil from a wastewater. Another advantage may be that backwashing may allow for solids removal, since solids may build up on the vessels, causing high pressure drops and subsequent decreases in performance. The presence of DAF device 206 may increase efficiency, allowing for increased run times between backwashing vessels 202 and 204, which results in reduced volumes of backwash. Potentially, system 20 could eliminate the need for a primary separation process positioned upstream from feed stream 200. This may allow for a reduction in footprint, and a decrease in operating costs, which are important in off-shore systems and processes.

EXAMPLES

The systems and methods described herein will be further illustrated through the following examples, which are illustrative in nature and are not intended to limit the scope of the disclosure.

Example 1

Media Performance Capabilities

A test was performed to evaluate the separation capability of different types of media. Four different types of media were tested for oil removal performance: black walnut shells, finely chopped and sieved maple wood particles, high density polyethylene (HDPE), and a composite of about 50-60% maple wood by weight with the balance being HDPE. The composite was prepared by mixing the wood particles and polyethylene together, extruding the mixture and then chopping the resulting material into pellets. The size distribution of the media used for the comparison is summarized in Table 1.

TABLE 1

Description and Size of Each Media

| Material | Size of Media |
| --- | --- |
| HDPE | ~5-10 mesh (2-4 mm) |
| Composite | ~5-10 mesh (2-4 mm) |
| Black Walnut Shells | ~12-16 mesh (1.2-1.7 mm) |
| Maple Wood Particles | ~10-30 mesh (0.6-2.0 mm) |

Light Arabian crude oil was pumped into a stream of tap water downstream of a centrifugal pump. The mixture was then sheared through a fully open globe valve and a static mixer to produce finely divided free oil droplets in water at a concentration of 200 ppm. The oil/water mixture was then routed through a column of media from top to bottom. Two sizes of columns were tested. The first was fabricated from 4" diameter PVC pipe and did not contain a draft tube. This design required that the media be removed from the column, placed into a container, and then mechanically agitated to perform the backwash operation. The second column was fabricated from 6" diameter PVC pipe that was equipped with a 2" diameter draft tube placed in the center of the 6" pipe for purposes of performing backwashing operations. For this design, air was added inside of the draft tube to induce fluidization and agitation of the media.

Figure 3:
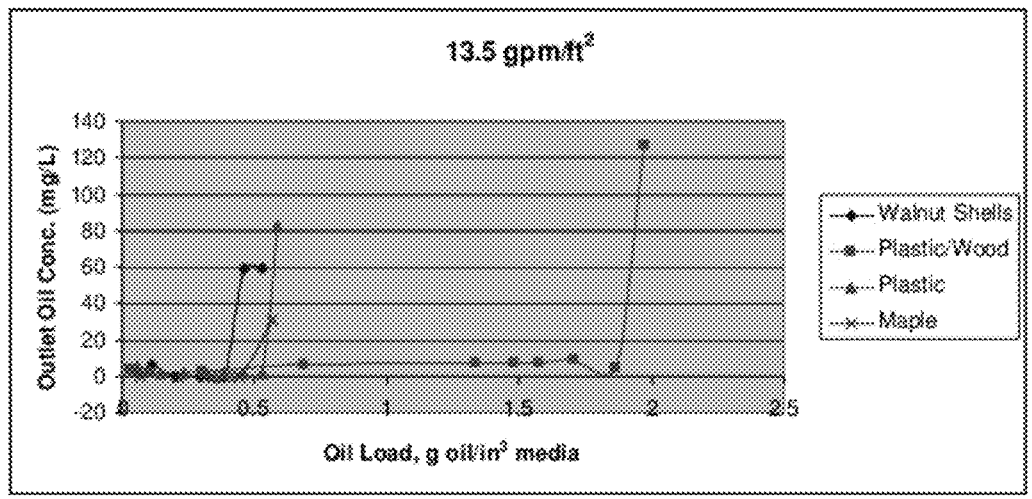
FIG. 3 is a graph illustrating the results from media testing in accordance with one or more aspects of the disclosure.

The water and oil mixture was directed through the different types of media at a flux rate of 13.5 gpm/ft$^2$ and values for the total volume of fluid that was processed were recorded. Samples of the effluent from the column were collected and tested using a gravimetric analysis and hexane technique according to ASTM Method 1664A to determine the concentration of residual oil remaining in the aqueous-based effluent. A result greater than 10 ppm of oil was considered the breakthrough value, at which point the test was terminated and the media was backwashed to restore performance. The effluent from the backwashing may be recycled back to the system. For example, the effluent from the backwashing may be recycled to upstream equipment such as a phase separator or API separator. The mass of oil loaded per cubic inch of media was plotted versus the concentration of oil in the effluent and presented in FIG. 3. The results indicated that nearly four times the mass of oil could be loaded onto the composite media than on any of the other materials before breakthrough occurred. Each of the two individual components of the composite, wood or plastic (polymer) were tested and neither one exhibited a loading capacity anywhere near the capacity of the composite. This was an unexpected result. Without being bound by theory, one possible explanation for the beneficial effects of the combination of wood and HDPE is that the two components each offer different adsorption properties and that a synergy is afforded by the combination of the two materials. A second possible explanation is that the shape of the composite particles contributes toward the separation process. These results show that the composite material outperforms current commercial media comprising black walnut shell, and, individually, wood or plastic (polymer), from an oil loading standpoint by a factor of four.

Testing using a similar set-up as the first test was also performed to determine if the composite media was capable of being backwashed. A column was fabricated from 6" diameter PVC pipe that was equipped with a 2" diameter draft tube placed in the center of the 6" pipe for purposes of performing backwashing operations. Consecutive flow runs with a water and oil feed solution comprising 200 mg/L of oil were performed with the composite media until there was visible breakthrough in the effluent. The media was then backwashed and the flow runs were repeated two more times to determine if there was a falloff in performance after each backwash, indicating deterioration of the media.

Figure 4:
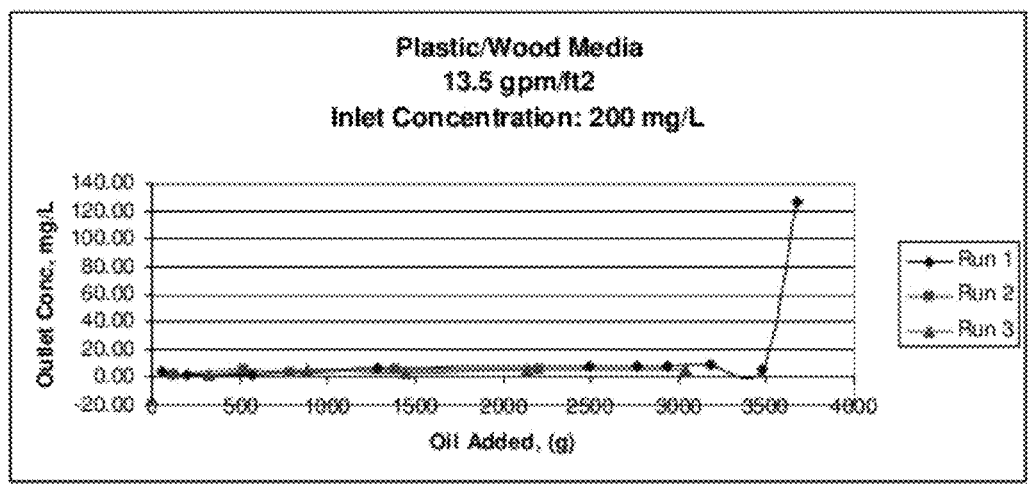
FIG. 4 is a graph illustrating the results from media testing in accordance with one or more aspects of the disclosure.

The mass of oil loaded per cubic inch of media was plotted versus the concentration of oil in the effluent and presented in FIG. 4. The results indicated that the composite media was capable of being backwashed using the same procedure as currently used in Siemens AG Monosep™ a walnut shell media system without experiencing a reduction in performance. In Run 1, 3500 g of oil was loaded onto the composite media before a breakthrough was observed. In Run 2 and Run 3, which were ended after 2200 g and 3100 g of oil were added respectively, the concentration of oil in the effluent never exceeded 10 ppm. Each of the three runs summarized in FIG. 4 greatly exceeded the performance of the other types of media that were tested, including black walnut shell media. The other types of media typically show breakthrough after only 800-1200 g of oil were loaded onto the media. In addition, attrition testing with the media did not show significant amounts of degradation after approximately five months of agitation.

The results of the testing indicated that the composite media is capable of reducing the concentration of free oil in a feed solution from a value of 200 ppm of free oil to a value of less than 10 ppm in the effluent exiting the column for an extended period of time. Testing was also performed with feed containing 500 ppm of free oil (the typical maximum for the oil concentration in secondary applications). These results indicated that this composite media has the potential for use in not only tertiary applications but also secondary applications, with the potential for eliminating the need for tertiary treatment.

Although the testing shows the results from a composite media comprising a mixture of maple wood and HDPE and the percent of wood in the composite mixture is approximately 50% by weight, the methods and systems described herein are not limited to this percentage or these specific types of materials. Additionally, the methods and systems described herein are not limited to these specific types of cellulose-based material or polymers.

Example 2

Maple Wood Media vs. Black Walnut Shell Media Capability

A test was performed to compare the separation capabilities of chopped maple wood and black walnut shell medias. The chopped maple wood was sized at approximately 10-30 mesh (0.6-2.0 mm). The black walnut shell media was sized at approximately 12-16 mesh (1.2-1.7 mm). The media bed was fabricated from a section of 4" diameter PVC pipe that was long enough to create a 60" bed of media retained by a screen positioned at the bottom. To perform the backwash operation, the media was removed from the column, placed into a 5 gallon pail, and mechanically agitated with a paddle. During the test, the same media was repeatedly backwashed and placed back into the media bed. Feed solution was prepared from a mixture of water and oil that was sheared through two globe valves to create small oil droplets. The water and oil mixture was directed through the different types of media at three different flux rates: 13.5, 20.25 and 27 gpm/ft$^2$. Values for the total volume of fluid that was processed were recorded. Samples of the effluent from the media bed were collected on a periodic basis and tested using the gravimetric analysis and hexane technique to determine the concentration of residual oil remaining in the aqueous-based effluent. A result greater than 10 ppm of oil was considered the breakthrough value, at which point the test was terminated and the media was backwashed to restore performance.

Figure 5:
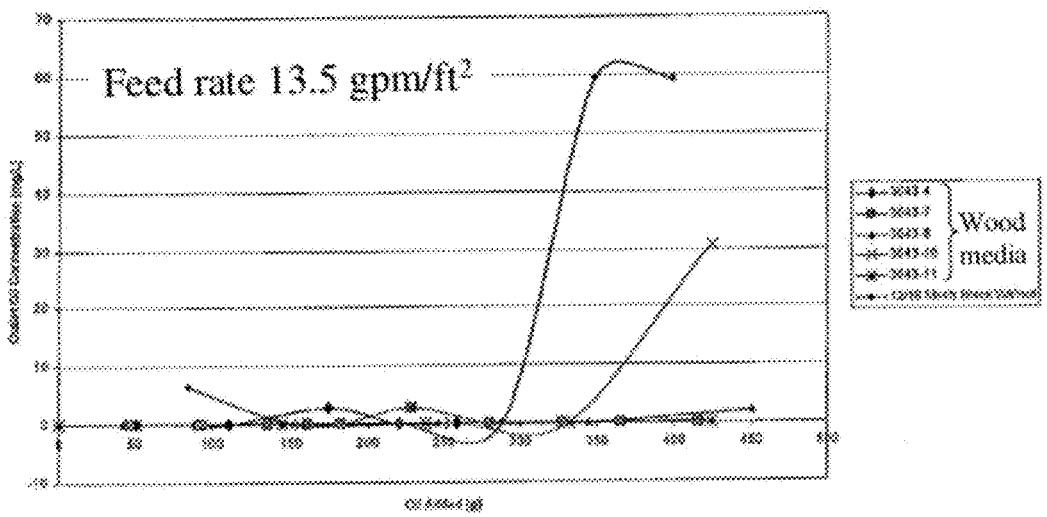
FIG. 5 is a graph illustrating the results from media testing in accordance with one or more aspects of the disclosure.
Figure 6:
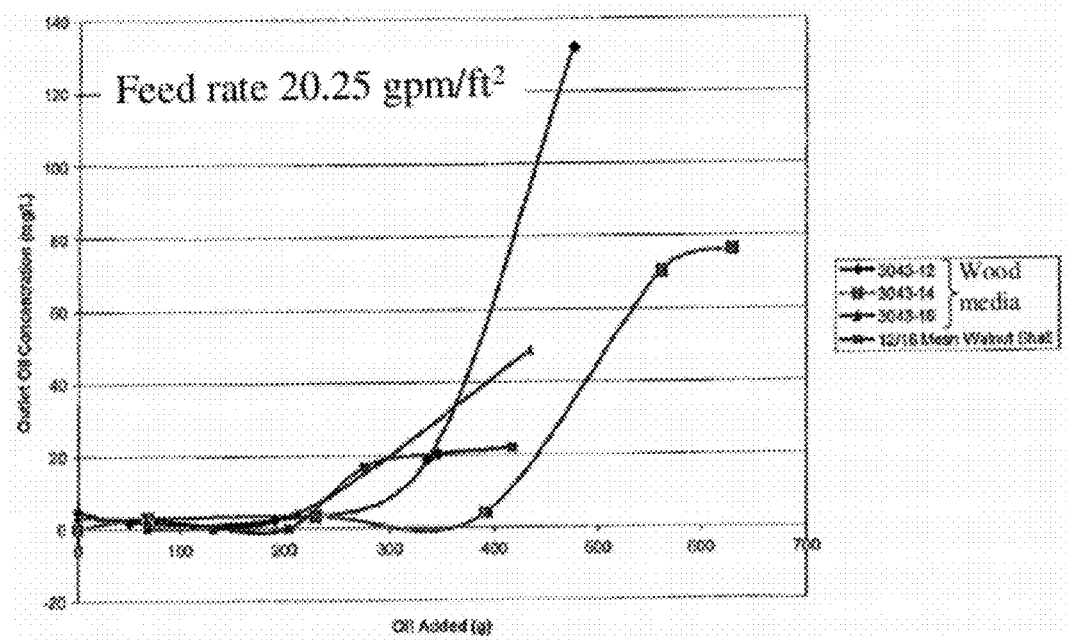
FIG. 6 is a graph illustrating the results from media testing in accordance with one or more aspects of the disclosure.
Figure 7:
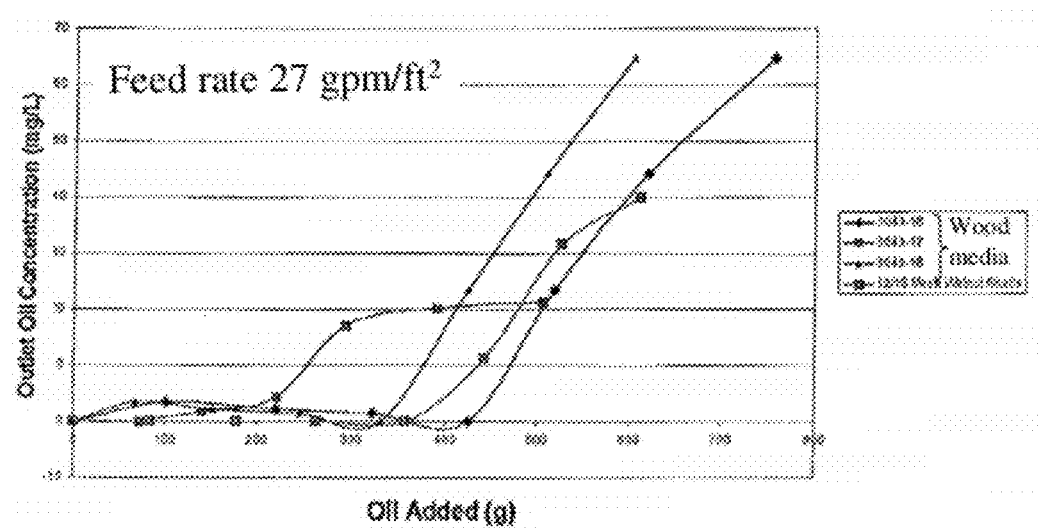
FIG. 7 is a graph illustrating the results from media testing in accordance with one or more aspects of the disclosure.

The mass of oil loaded per cubic inch of media versus the concentration of oil in the effluent for each of the three flow rates was plotted and is presented in FIGS. 5-7. The results indicate that it was possible to backwash the wood media and re-use it without experiencing a drop-off in performance. The wood media outperformed the walnut shell media in terms of loading capacity in each of the three flow rate test conditions. In addition, when the flux rate was increased from 13.5 gpm/ft$^2$ to 27 gpm/ft$^2$, the amount of oil that could be loaded onto the walnut shell media before breakthrough was detected in the effluent decreased from 300 g to 250 g. In contrast, when using the maple wood media, there was very little drop-off in performance when the flux rate was increased. The ability to increase the flux rate without experiencing a drop-off in performance means that the footprint of the equipment can be significantly decreased, which is a major advantage over existing systems, especially for purposes of off-shore processing.

Example 3

Coalescer and Filter Device Combination

A test was performed using feed water containing mechanically emulsified oil comprising oil droplets that were less than 5-10 microns in diameter. To mechanically emulsify the oil in the feed water, two centrifugal pumps were placed in series. Light Arabian crude oil was pumped into the suction side of the first pump and then through the second pump. Oil that passed through both pumps was then passed through a globe valve. The feed water was pumped through a coalescer containing composite media (size 5-10 mesh (2-4 mm) and composed of approximately 50% HDPE and 50% maple wood) at a high flow rate to create a coalesced stream comprising larger oil droplets. The coalescer was constructed of a 4" diameter, 8' long PVC pipe containing composite media. Feed water was passed through the coalescer at a flux rate of approximately 150 gpm/ft$^2$. The coalescer was constructed so that the direction of flow could be switched between top-to-bottom flow and bottom-to-top every 4 hours.

The oil could be removed from the coalesced stream by pumping it through a filter device containing the composite media at a lower flow rate to produce an effluent. The filter device was constructed of a 12" diameter, 66" long PVC pipe containing composite media. The filter device was fitted with a 4" diameter, 4' long draft tube (positioned at the bottom of the filter device) and an inlet for inserting air. The flow direction in the filter device was reversed and air was added to perform a backwashing process on the media every 4-6 hours, depending on performance. The coalesced stream was passed through the filter device at a flux rate of approximately 20 gpm/ft$^2$. Screens were used on both the coalescer and filter device to contain the media.

To determine the concentration of emulsified oil in the feed water and effluent, a Turner TD-500™ (Turner Designs Hydrocarbon Instruments, Inc. Fresno, Calif.) fluorescent oil-in-water meter was utilized. Samples were first collected in a separatory funnel and allowed to sit stagnant for 30 minutes. For purposes of measurements, samples were then taken from the center of the separatory funnel and analyzed for oil content.

Data was collected from the coalescer when it was filled with media as well as from bypassing the coalescer and going to the filter device. Feed water samples were collected downstream of the feed pumps and globe valve, and upstream of the coalescer. Effluent samples were collected downstream from the filter device.

Table 2 shows the results from the data that was collected when the coalescer was bypassed and the feed water was sent straight to the filter device.

TABLE 2

Results of Bypassing the Coalescer

| Time (hours) | Feed Total Oil (ppm) | Effluent Total Oil (ppm) |
| --- | --- | --- |
| 0 | 1776 | 390 |
| 4 | 1025 | 105 |
| 5 | 817 | 244 |
| 6.5 | 1840 | 415 |
| 7 | 1115 | 232 |

The results indicate that the filter device was capable of removing some of the oil from the feed water.

The coalescer was then placed back in-line upstream of the filter device. The results from the coalescer and filter device combination are shown in Table 3.

TABLE 3

Results of Coalescer Followed by Filter Device

| Time (hrs) | Feed Total Oil (ppm) | Effluent Total Oil (ppm) | Feed Emulsified Oil (ppm) | Effluent Emulsified Oil (ppm) |
| --- | --- | --- | --- | --- |
| 1.17 | 529.9* | 62 | 532.2* | 36.2 |
| 3.42 | 284.8 | 47.5 | 223.2 | 27.1 |
| 4.50 | 433.4 | 49.6 | 397.7 | 28.4 |
| 4.75 | 646.4* | 43.2 | 717.0* | 24.5 |

The results indicate that the media composite is capable of functioning as both an emulsified oil coalescer as well as a free oil filter. The flow rate through the vessel containing the media composite may dictate how the media and vessel combination performs. A high flux rate, for example, greater than about 100 gpm/ft$^2$ through the vessel may promote oil coalescing, and a lower flux rate, for example, less than about 27 gpm/ft$^2$ through the vessel, may allow the vessel to function as a filter device. Placing the coalescer and filter device in series allows for highly mechanically emulsified oil in water to be separated from a wastewater stream.

The combination of the coalescer and filter device creates an all-in-one secondary and tertiary separated with a small footprint, which may make it attractive for off-shore processes. The results from the test also indicate that the large size of the media composite and the low pressure drop reduce the potential for plugging of the media bed in the coalescer and filter device. Additionally, the media composite was shown to be successful as a backwashable oil removal media. When the media composite became plugged, the draft tube backwashing was effective at removing solids and other contaminants that create the potential for plugging. This is a big benefit over tight packing media, for example, walnut shells, or non-backwashable fixed media, for example, that used in corrugated plate separators.

Example 4

Coalescer and Corrugated Plate Interceptor Combination

A test was performed using feed water containing mechanically emulsified oil comprising oil droplets that were less than 5-10 microns in diameter. To mechanically emulsify the oil in the feed water, two centrifugal pumps were placed in series. Light Arabian crude oil was pumped into the suction side of the first pump and then through the second pump. Oil that passed through both pumps was then passed through a globe valve. The feed water was pumped through a coalescer containing composite media (size 5-10 mesh (2-4 mm)) and composed of approximately 50% HDPE and 50% maple wood) at a high flow rate to create a coalesced stream comprising larger oil droplets. The coalescer was constructed of a 6" diameter, 80" long PVC pipe containing composite media. The pipe was flanged at each end and the nozzles in each flange were covered with screen to keep the media in place inside of the column. Feed water was passed through the coalescer at a flux rate of approximately 100 gpm/ft$^2$.

The oil could then be removed from the coalesced stream by passing it through a corrugated plate interceptor (CPI) separator positioned downstream of the coalescer. The CPI device used separation plates to create a quiescent zone that allowed for the oil droplets to float and separate from the influent water. The separated oil rose up the separation plates to the top Of the device and was skimmed by an adjustable weir. Clean water flowed upward through the effluent compartment, then over an adjustable weir before exiting out of the device.

To determine the concentration of emulsified oil in the feed water and effluent, a Turner TD-500™ fluorescent oil-in-water meter was utilized. Samples were first collected in a separatory funnel and allowed to sit stagnant for 30 minutes. For purposes of measurements, samples were then taken from the center of the separatory funnel and analyzed for oil content.

Data was collected from the coalescer when it was filled with media as well as when it was empty, before passing the coalesced stream through the CPI device. The results from the test performed where no media was present in the coalescer are presented in Tables 4 and 5.

TABLE 4

Results from Testing Performed with No Media in Coalescer and CPI Device Positioned Downstream

| Time (hours) | Feed Total Oil (ppm) | Feed Emulsified Oil (ppm) | Coalescer Outlet Total Oil (ppm) | Coalescer Outlet Emulsified Oil (ppm) | CPI Device Outlet Total Oil (ppm) | CPI Device Outlet Emulsified Oil (ppm) |
|---|---|---|---|---|---|---|
| 1.3 | 141.4 | 78.9 | 107.6 | 73.5 | 84.6 | 92.3 |
| 2 | 158.9 | 100.8 | 99.6 | 57.2 | 72.6 | 66.7 |

TABLE 5

Emulsified Oil Data from Testing Performed with No Media in Coalescer and CPI Device Positioned Downstream

| Percent Emulsified Oil in Feed | Percent Emulsified Oil in Coalescer Effluent |
|---|---|
| 55.8 | 68.3 |
| 63.4 | 57.4 |

The data from the test performed with an empty coalescer (no media) indicated that nearly all of the oil in the feed water was emulsified and was not removed in the system. This is exemplified by the fact that when comparing the percentage of emulsified oil in the feed stream to the percentage of emulsified oil in the coalescer effluent, the values either increased (as in the 1.2 hour data point) or only decreased modestly (as in the 2 hour data point).

Data was then collected after the vessel was filled with the media composite and saturated with oil. The first test was conducted using the media as a coalescer and analyzing the feed and coalescer effluent for free and emulsified oil. The results from this test are shown in Table 6. In contrast to the data presented in the experiment with no media, the results with using the media indicated a significant decrease in the concentration of emulsified oil in the coalesced stream as compared to the feed.

TABLE 6

Results from Testing with Coalescer Full of Media

| Time (hours) | Feed Total Oil (ppm) | Feed Emulsified Oil (ppm) | Coalescer Effluent Total Oil (ppm) | Coalescer Effluent Emulsified Oil (ppm) |
|---|---|---|---|---|
| 0.25 | 132.7 | 92.6 | 149.5 | 35.4 |
| 2.75 | 151.2 | 105.8 | 111.5 | 34.4 |
| 5.75 | 132.0 | 142.5 | 198.6 | 21.8 |
| 8.00 | 171.6 | 57.6 | 143.6 | 25.7 |

Results of the testing conducted with the coalescer filled with the media composite are shown in Tables 7 and 8. Again, the results with using the media indicated a significant decrease, over time, in the concentration of emulsified oil in the coalesced stream as compared to the feed. In addition, the CPI device was capable of dramatically decreasing the total oil concentration in the coalesced stream, while maintaining the oil in a coalesced form.

TABLE 7

Results from Coalescer Filled with Media Composite
and CPI Device Positioned Downstream

| Time (hours) | Feed Total Oil (ppm) | Feed Emulsified Oil (ppm) | Coalescer Effluent Total Oil (ppm) | Coalescer Effluent Emulsified Oil (ppm) | CPI Device Effluent Total Oil (ppm) | CPI Device Effluent Emulsified Oil (ppm) |
|---|---|---|---|---|---|---|
| 1.42 | 101.5 | 40.6 | 128.2 | 35.3 | 22.5 | 20.6 |
| 3.42 | 102.7 | 71.3 | 203.3 | 30.6 | 25.9 | 19.5 |
| 5.42 | 157.5 | 90 | 178.3 | 32.8 | 20.8 | 15.2 |

TABLE 8

Emulsified Oil Data from Testing with Coalescer Filled with
Media Composite and CPI Device Positioned Downstream

| Percent Emulsified Oil in Feed | Percent Emulsified Oil in Effluent |
|---|---|
| 40 | 27.5 |
| 69.4 | 15.1 |
| 57.1 | 18.4 |

Example 5

Multiple Short Bed Coalescer Combination

Figure 8:
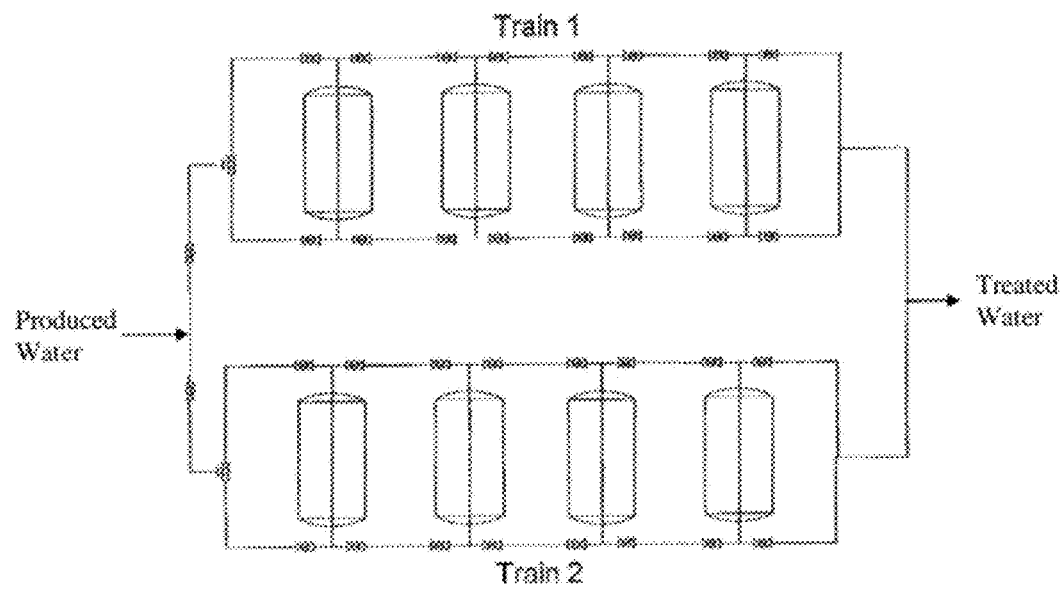
FIG. 8 is a schematic drawing of a process flow diagram in accordance with one or more aspects of the disclosure.

A hypothetical example of a Multiple Short Bed Coalescer (MSBC) process set-up is illustrated in FIG. 8. Two trains of 4 vessels each may be filled with composite media (size 5-10 mesh (2-4 mm) and composed of approximately 50% HDPE and 50% maple wood). Each vessel may be about 18" in length. Each train may be designed to handle 100% of the influent water. During normal operation, the two trains may be operated in parallel, with each train receiving 50% of the influent flow. The system may be designed so that one train can be isolated at a time and receive 100% of the influent flow. This may serve to clean the media by doubling the velocity of the flow, which may act to remove excess oil that is building up in the media. Previous testing has indicated that when the flux rate is increased beyond 40 gpm/ft$^2$, the media composite is no longer capable of filtering out the oil. By increasing the velocity through the vessel, the excess oil may be flushed out.

The design may also allow for the flow of the influent to be reversed through each vessel for purposes of mitigating plugging from solids, with each train receiving 50% of the incoming flow. Previous testing has indicated that solids begin to collect on the inlet side of the vessel. By reversing the flow through the vessel, solids may be purged from the system. The bottom and top of each vessel may be fitted with a screen to keep media in the vessel.

Example 6

Coalescer Testing

A series of tests were conducted to evaluate the ability of the media composite to coalesce mechanically emulsified oil into larger oil droplets that could be removed using a flotation oil removal technology. As a general rule, flotation technologies are only capable of removing oil droplets that are greater than 50 microns in diameter.

Figure 9:
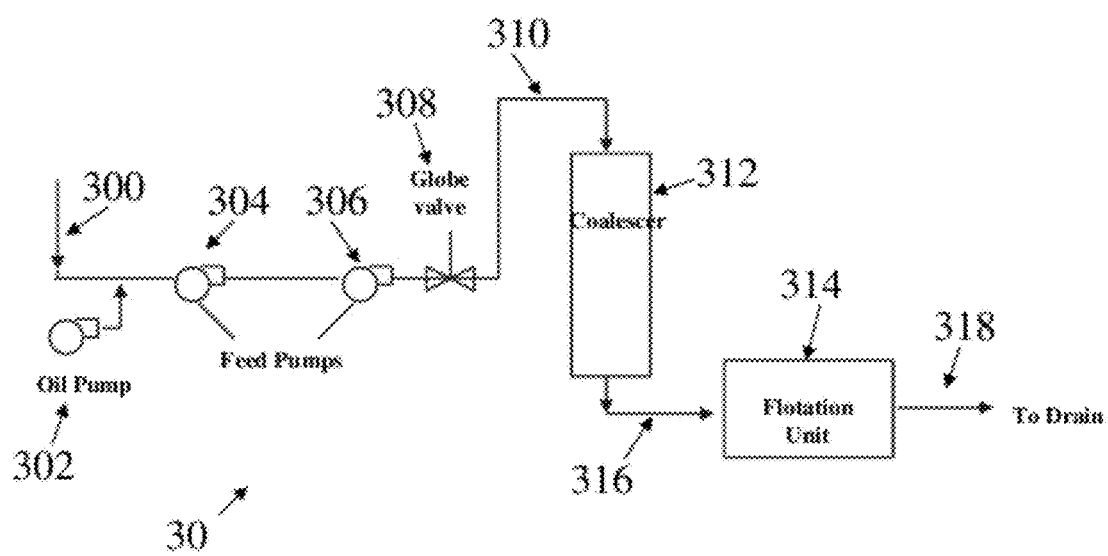
FIG. 9 is a schematic drawing of a process flow diagram in accordance with one or more aspects of the disclosure.

Testing was conducted according to the flow scheme illustrated in FIG. 9. Treatment system 30 includes feed stream 200 comprising oil and water was first pumped into the feed line by pump 302. After passing through pump 302, the oil and water stream was transferred through two centrifugal feed pumps 304, and 306, that were configured in series, with pump 306 positioned downstream from pump 304. Pumps 304 and 306 served to mechanically emulsify the oil before pumping it to the coalescer. Globe valve 308 was positioned downstream from pumps 304 and 306. Emulsified stream 210 passed through coalescer 312 and exited the coalescer as coalesced stream 316. After passing through the coalescer, coalesced stream 316 was transferred to a CPI separator 314 to produce effluent 318.

Figure 10:
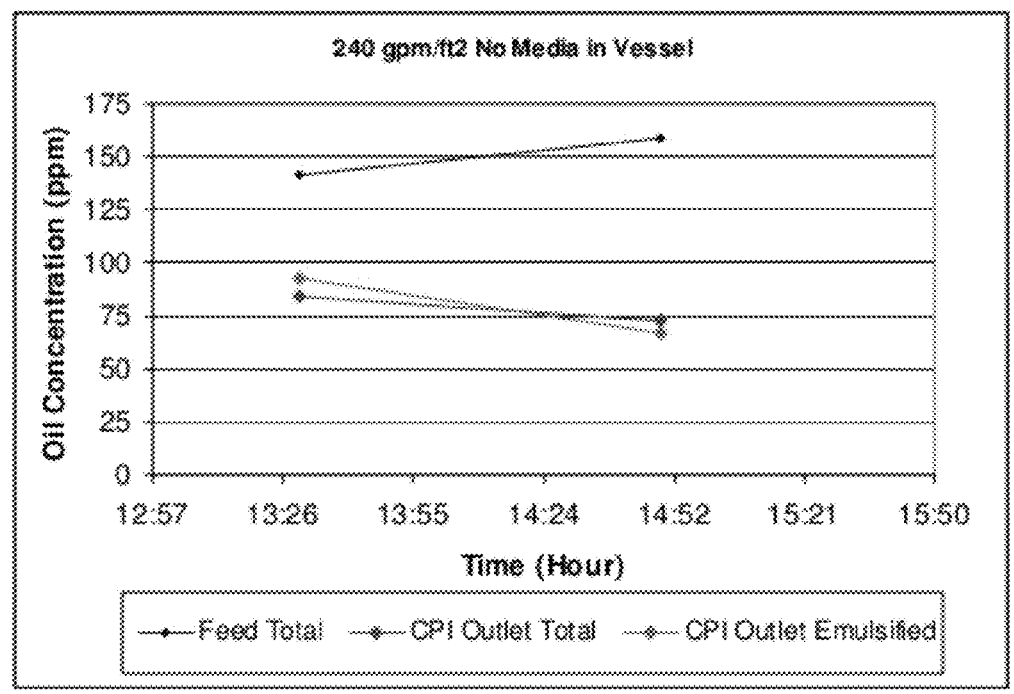
FIG. 10 is a graph illustrating the results from media testing in accordance with one or more aspects of the disclosure.

Baseline data was accumulated by pumping mechanically emulsified oil through an empty coalescer. The coalescer was 6" in diameter and 90" in length. The flow rate was 50 gpm, resulting in a flux rate of 240 gpm/ft$^2$. Samples of the feed water and CPI effluent were collected and analyzed for oil concentration. Results from the baseline test are illustrated in FIG. 10. The data shows that the empty vessel was not effective at coalescing the emulsified oil, as evidenced by the high concentration of oil in the CPI effluent. The CPI separator was only capable of removing 48% of the total oil in the feed when the coalescing vessel was empty.

Figure 11:
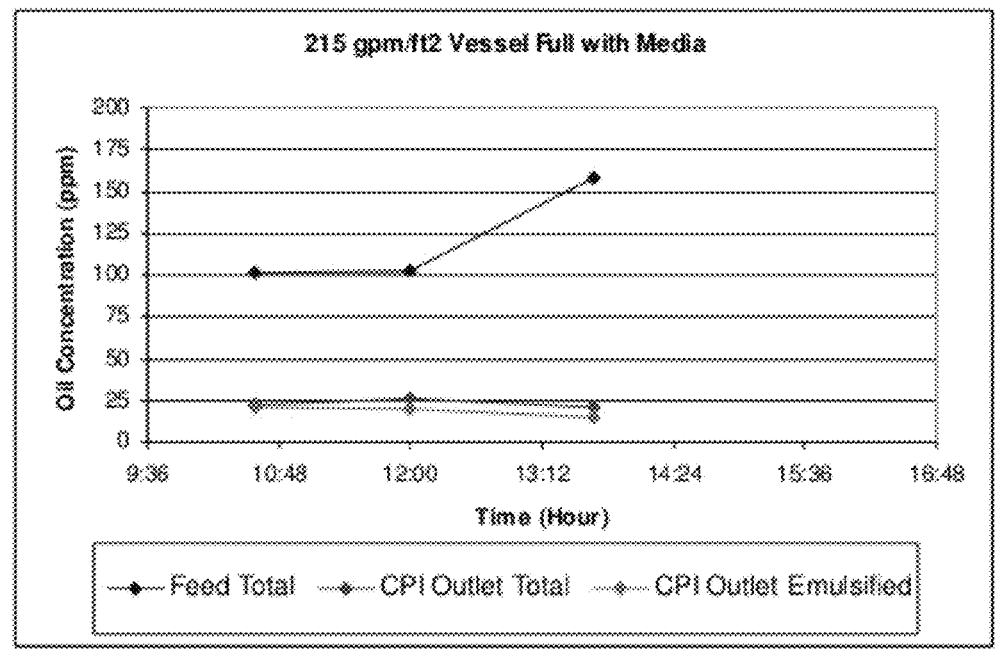
FIG. 11 is a graph illustrating the results from media testing in accordance with one or more aspects of the disclosure.

The vessel was then filled with 80" in length of media composite and the test was repeated. The raw feed water had a starting concentration of oil of approximately 125 mg/L, with an average of 75% of that oil being emulsified. FIG. 11 illustrates the data collected during the testing. The results indicated that the coalescer was effective at growing the emulsified oil into larger droplets that could be removed by the CPI separator. The media was effective at coalescing the emulsified oil into larger droplets that could be removed by the CPI device. The data shows the oil concentration of the CPI device effluent was <25 mg/L for all samples collected. When the vessel was empty, the CPI device effluent had averaged 78 mg/L oil. This means that the coalescing vessel filled with the composite bulk media improved the performance of the CPI device, resulting in a total oil removal of 81%, as compared to only 48% when the vessel was empty.

Further oil concentration analysis was conducted by collecting feed and coalescer effluent samples in a separatory funnel. Samples were collected in the separatory funnel and a stopwatch was started immediately. Samples were then collected from the bottom of the separatory funnel to determine how quickly the oil would float. Table 9 shows the data collected during this test.

TABLE 9

Separately Funnel Flotation Analysis

| Feed Time (min.) | Feed Oil (ppm) | Coalescer Effluent Time (min.) | Coalescer Effluent Oil (ppm) |
|---|---|---|---|
| Total | 92.6 | Total | 153.8 |
| 1 | 78.3 | 1 | 18.6 |

TABLE 9-continued

Separately Funnel Flotation Analysis

| Feed Time (min.) | Feed Oil (ppm) | Coalescer Effluent Time (min.) | Coalescer Effluent Oil (ppm) |
|---|---|---|---|
| 2 | 75.9 | 2 | 12.9 |
| 4 | 71.6 | 4 | 8.9 |
| 6 | 76.9 | 6 | 11.3 |
| 8 | 79 | 8 | 11.8 |
| 10 | 76.6 | 10 | 17.4 |
| 30 | 41 | 30 | 7.8 |

The results indicate that the oil in the feed was highly emulsified (>50%) and did not rise very quickly. The coalescer had only 5% emulsified oil in the sample. The vast majority of the oil in the coalescer effluent was able to float in 1 minute, indicating the presence of very large oil droplets in the sample.

Testing was also performed to analyze the size of the oil droplets. The test used a 72" tall coalescer with a 6" diameter. Instead of two centrifugal pumps, the process used one larger centrifugal pump that recycled 75% of the flow to the coalescer to increase the concentration of the mechanically emulsified oil in the feed.

A JM Canty, Inc. liquid particle analyzer Model VD4912-456 (Buffalo, N.Y.) was used to collect oil droplet size analysis data. The particle analyzer was equipped with a high speed camera that recorded a video of the water sample. The video was analyzed by software that allowed the measurement of each oil droplet. The particle analyzer was capable of measuring oil droplets that ranged from 0.7-2000 microns in diameter.

Figure 12:
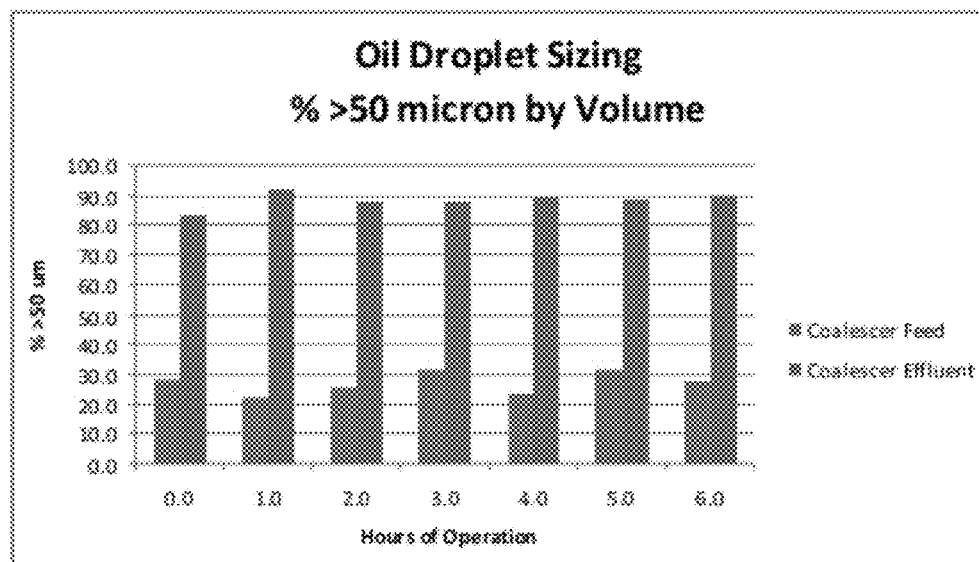
FIG. 12 is a graph illustrating the results from media testing in accordance with one or more aspects of the disclosure.

Data was collected during an 8 hour test run with the coalescer operating at a flux rate of 100 gpm/ft$^2$. Each hour a slip stream of both the feed and effluent were sent to the Canty particle analyzer to obtain oil droplet sizing analysis. FIG. 12 represents all of the data collected during this time period. In general, conventional flotation technologies can guarantee removal of oil droplets that are >50 microns in diameter, but generally are incapable of removing droplets<50 microns in diameter.

FIG. 12 indicates the percentage of the oil droplets in the given sample that were greater than 50 microns in diameter. During the 8 hour test run the average size of oil droplets that were greater than 50 microns in diameter in the feed was 26.8%. After passing through the coalescer, the oil droplets grew, and on average 88.2% were greater than 50 microns in diameter in the effluent. This indicates that if raw feed water were sent to a conventional flotation unit, only 26.8% of the oil would be removed. If the same raw feed water were instead passed through a coalescer prior to the flotation unit, 88.2% of the oil would be removed. By sending the raw feed through the coalescer, performance was increased over the conventional flotation unit by 329%.

Figure 13:
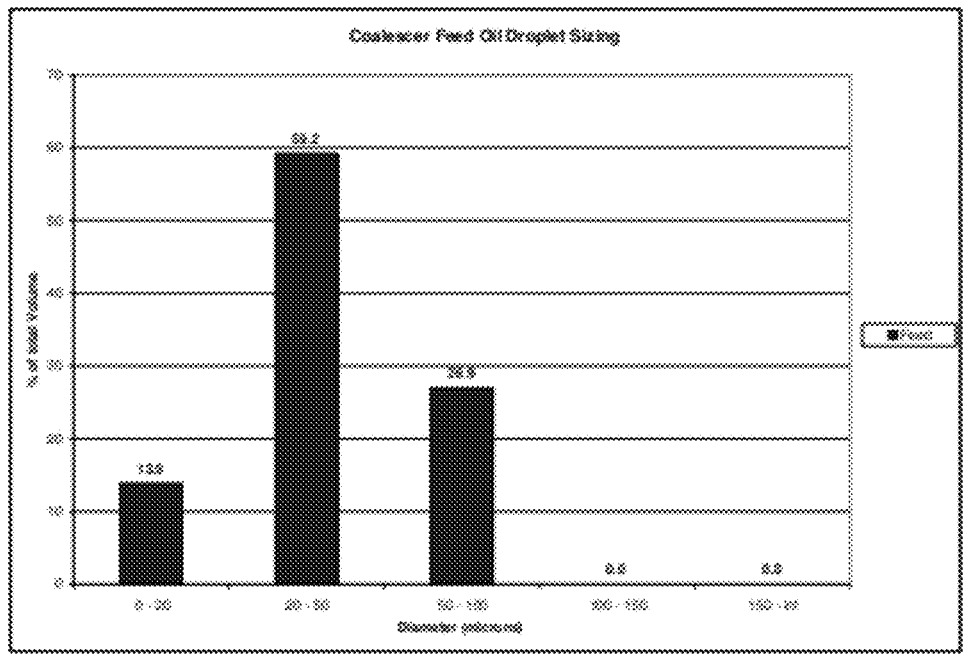
FIG. 13 is a graph illustrating the results from media testing in accordance with one or more aspects of the disclosure.
Figure 14:
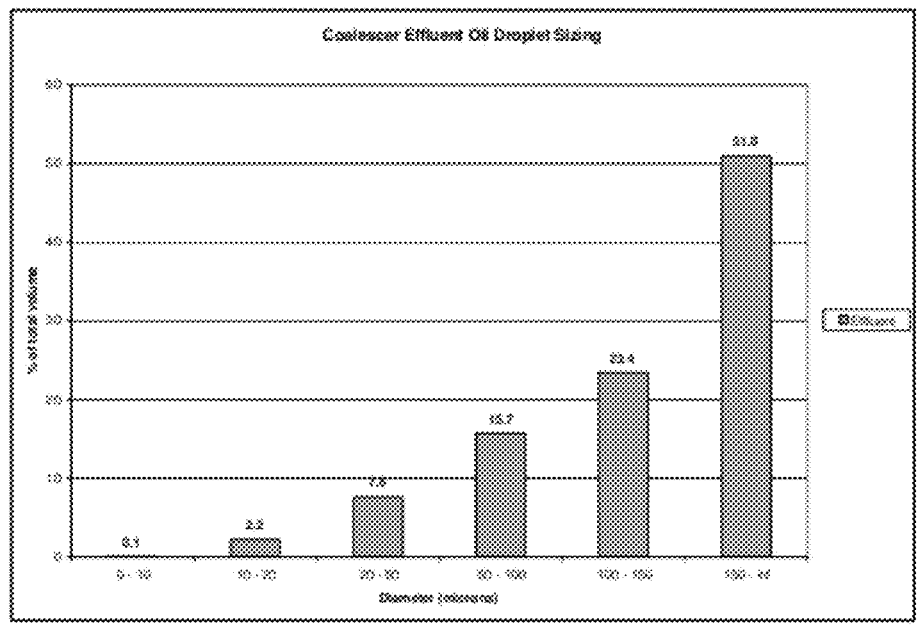
FIG. 14 is a graph illustrating the results from media testing in accordance with one or more aspects of the disclosure.

FIGS. 13 and 14 show the raw data that was collected from the Canty particle analyzer. During analysis, the oil droplets are grouped into size ranges that allow for more efficient data analysis. FIG. 13 charts the oil droplet sizing analysis from one of the raw feed data samples collected from the particle analyzer, and FIG. 14 charts the oil droplet sizing analysis collected from a sample of coalescer effluent.

During the analysis, pictures were taken of each recorded sample. The pictures indicated that the feed had a very dense concentration of small oil droplets. In contrast, the coalescer effluent had a far less dense concentration of oil droplets. There were fewer oil droplets, and they were much larger in size, for example, at least one result indicated a droplet with a diameter of 121 microns. The results of this test indicated that the coalescer is capable of producing a coalesced stream where over 50% of the droplets are greater than 50 microns in diameter. In addition, the coalescer was capable of providing consistent results over a span of at least six hours.

Example 7

Pine and Polypropylene Composite Media Capability

A test was performed to evaluate the separation capability of a pine wood and polypropylene composite media. The composite media comprised about 70% pine wood and about 30% polypropylene. The composite was prepared by mixing the wood particles and polypropylene together, extruding the mixture and then chopping the resulting material into pellets. Oil was pumped into the discharge of a feed pump. The mixture was then sheared through a fully open globe valve and a static mixer to produce finely divided free oil droplets in water at a concentration of 200 ppm. The oil/water mixture was then routed through a column of media from top to bottom. The column was 4" in diameter with a media depth of 60".

The feed water was passed through the composite media at a flux rate of 20 gpm/ft$^2$. The inlet and outlet pressure of the column, the flow rate and the concentration of oil in the effluent were monitored. The results of the test are shown below in Table 10.

TABLE 10

Pine Wood and Polypropylene Composite Media Results

| Time (hours) | Flow Rate (gpm) | Inlet Pressure (psi) | Outlet Pressure (psi) | Oil Level (mL) | Oil Added (g) | Calculated Oil Added (mg/L) | Effluent Total Oil (ppm) |
|---|---|---|---|---|---|---|---|
| 0.0 | 1.8 | 25 | 25 | 1800 | | | |
| 0.5 | 1.8 | 25 | 25 | 1750 | 45 | 220.2 | 3.3 |
| 1.0 | 1.8 | 25 | 25 | 1700 | 90 | 220.2 | 2.6 |
| 1.5 | 1.8 | 25 | 25 | 1650 | 135 | 220.2 | 3.2 |

Figure 15:
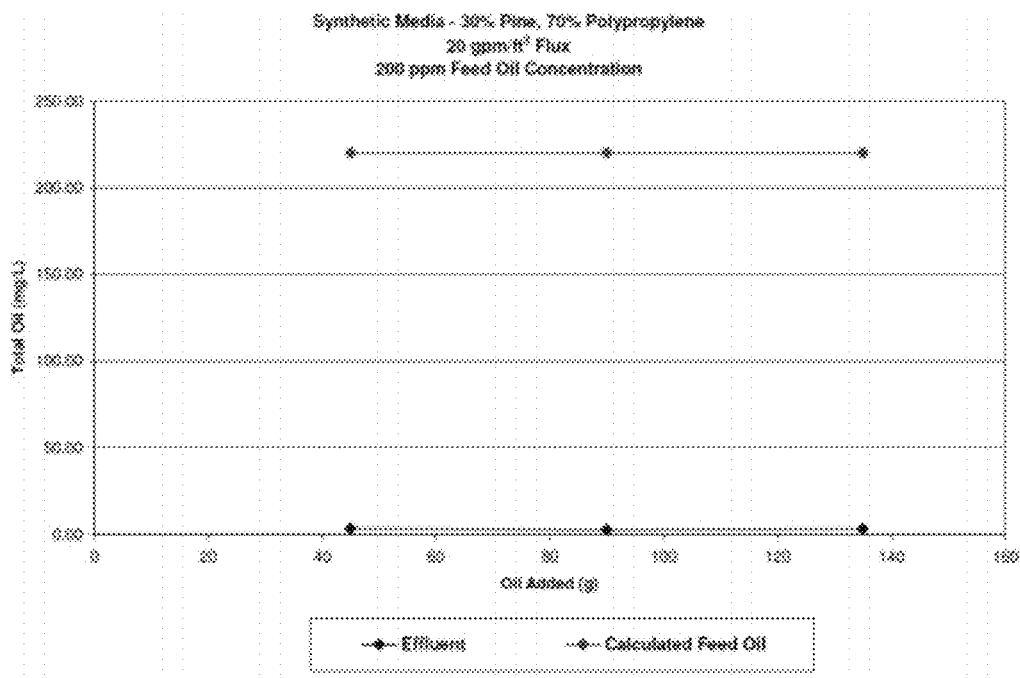
FIG. 15 is a graph illustrating the results from media testing in accordance with one or more aspects of the disclosure.

The mass of oil loaded per cubic inch of media was plotted versus the concentration of oil in the effluent and presented in FIG. 15. The results of the testing indicated that the pine wood and polypropylene composite media is capable of reducing the concentration of free oil in a feed solution from a value of 200 ppm of free oil to a value of less than 10 ppm in the effluent exiting the column for an extended period of time. In addition, there was little to no pressure drop across the column or change in flow rate during the course of the test.

This example demonstrates the effectiveness of another wood/polymer composite media and shows that another ratio (70:30) of wood to polymer may provide effective filtering of and separation of oil from water.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including," "comprising," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority.

While exemplary embodiments of the disclosure have been disclosed many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the systems and methods directed toward separation treatment processes using composite media of the present disclosure are used. Those skilled in the art will recognize, or be able to ascertain using no more than routine experimentation, many equivalents to the specific embodiments described herein. For example, those skilled in the art may recognize that the apparatus, and components thereof, according to the present disclosure may further comprise a network of systems or be a component of a separation treatment process using a composite media system. It is, therefore, to be understood that the foregoing embodiments are presented by way of example only and that, within the scope of the appended claims and equivalents thereto, the disclosed separation treatment processes using composite media systems and methods may be practiced otherwise than as specifically described. The present apparatus and methods are directed to each individual feature or method described herein. In addition, any combination of two or more such features, apparatus or methods, if such features, apparatus or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise a separation treatment processes using composite media. Accordingly, the foregoing description and drawings are by way of example only. Further, the depictions in the drawings do not limit the disclosures to the particularly illustrated representations.

What is claimed is:

1. A method for treating a feed stream comprising a hydrocarbon liquid and an aqueous-based liquid, comprising:
   introducing the feed stream to an inlet of a vessel containing a media composite, wherein the media composite comprises a plurality of single-phase, uniformly-shaped particles, each particle comprising a homogeneous mixture of a cellulose-based material and a polymer; and
   contacting the feed stream with the media composite to produce a treated stream, the treated stream comprises a predetermined target concentration of the hydrocarbon liquid.

2. The method of claim 1, wherein contacting the feed stream with the media composite comprises filtering the feed stream, wherein the predetermined target concentration of hydrocarbon liquid of the treated stream is less than a concentration of hydrocarbon liquid in the feed stream.

3. The method of claim 2, wherein the predetermined target concentration of hydrocarbon liquid in the treated stream is less than about 30 ppm.

4. The method of claim 1, wherein contacting the feed stream with the media composite comprises coalescing the feed stream, wherein the predetermined target concentration of hydrocarbon liquid in the treated stream is a reduced concentration of an emulsified hydrocarbon liquid relative to the feed stream.

5. The method of claim 4, wherein the concentration of emulsified hydrocarbon liquid in the treated stream is reduced relative to the feed stream by greater than about 50%.

6. The method of claim 5, wherein the treated stream comprises hydrocarbon liquid droplets of at least about 20 microns in diameter.

7. The method of claim 1, further comprising measuring at least one property of the treated stream.

8. The method of claim 7, further comprising backwashing the media composite based on the at least one measured property of the treated stream to produce a hydrocarbon liquid effluent.

9. The method of claim 8, further comprising recycling the hydrocarbon liquid effluent to the feed stream.

10. The method of claim 8, wherein the at least one measured property is at least one of a concentration of hydrocarbon liquid in the treated stream and a flow rate of the treated stream.

11. A method for treating a feed stream comprising a hydrocarbon liquid and an aqueous-based liquid, comprising:
    passing the feed stream at a first flux rate through a coalescar containing a media composite, wherein the media composite comprises a plurality of single-phase, uniformily-shaped particles, each particle comprising a homogeneous mixture of a cellulose-besed material and a polymer to produce a coalesced stream; and
    passing the coalesced stream at a second flux rate through a filter device in communication with the coalescer and containing the media composite to produce an effluent stream.

12. The method of claim 11, wherein the first flux rate is in a range of from about 100 to about 200 gpm/ft$^2$.

13. The method of claim 11, wherein the second flux rate is less than about 40 gpm/ft$^2$.

14. The method of claim 11, further comprising maintaining a concentration of hydrocarbon liquid in the effluent stream at a predetermined target percent reduction.

15. The method of claim 11, further comprising backwashing at least one of the coalescer and the filter device.

16. The method of claim 15, wherein backwashing the at least one of the coalescer and the filter device is based on a predetermined time interval.

17. The method of claim 13, further comprising measuring at least one property of the coalesced stream.

18. The method of claim 17, further comprising backwashing the coalescer based on the at least one measured property of the coalesced stream to produce a hydrocarbon liquid effluent.

19. The method of claim 18, wherein the at least one measured property is a flow rate of the coalesced stream.

20. The method of claim 11, further comprising measuring at least one property of the effluent stream.

21. The method of claim 20, further comprising backwashing the filter device based on the at least one measured property of the effluent stream to produce a hydrocarbon liquid effluent.

22. The method of claim 21, wherein the at least one measured property is at least one of a flow rate of the effluent stream and a concentration of hydrocarbon liquid in the effluent stream.

23. A method for treating a feed stream comprising a hydrocarbon liquid and an aqueous-based liquid, comprising:
    passing the feed stream through a coalescer containing a media composite, wherein the media composite comprises a plurality of single-phase, uniformly-shaped particles, each particle comprising a homogeneous mixture of a cellulose-based material and a polymer to produce a coalesced stream, the coalesced stream comprising a reduced concentration of an emulsified hydrocarbon liquid relative to the feed stream; and
    separating the coalesced stream by passing the coalesced stream through a separator device to provide at least one of a hydrocarbon liquid stream and an aqueous stream.

24. The method of claim 23, wherein the coalesced stream comprises hydrocarbon liquid droplets of at least about 20 microns in diameter.

25. The method of claim 23, wherein the separator device comprises at least one of a hydrocyclone, a filter device, a gravity settling device, and a flotation device.

26. The method of claim 25, further comprising measuring at least one property of the coalesced stream.

27. The method of claim 26, further comprising backwashing the coalescer based on the at least one measured property of the coalesced stream to produce a hydrocarbon liquid effluent.

28. The method of claim 27, wherein the at least one measured property is a flow rate of the coalesced stream.

29. A system for treating a feed stream comprising a hydrocarbon liquid and an aqueous-based liquid, comprising:
    at least one coalescer in communication with the feed stream and containing a media composite, wherein the media composite comprises a plurality of single-phase, uniformly-shaped particles, each particle comprising a homogeneous mixture of a cellulose-based material and a polymer; and
    at least one separator device in communication with the coalescer.

30. The system of claim 29, wherein the separator device is at least one of a filter device, a hydrocyclone, a gravity settling device, and a flotation device.

31. The system of claim 30, wherein the separator device is a filter device containing the media composite.

32. The system of claim 29, wherein the media composite comprises a concentration of cellulose-based material of at least about 50% by weight.

33. The system of claim 29, wherein the cellulose-based material comprises maple wood.

34. The system of claim 29, wherein the polymer comprises high density polyethylene.

35. A method of facilitating a treatment system for separating a hydrocarbon liquid and an aqueous-based liquid from a feed stream, the treatment system comprising at least one vessel in communication with the feed stream, the method comprising:
    providing a media composite, wherein the media composite comprises a plurality of single-phase, uniformly-shaped particles, each particle comprising a homogeneous mixture of a cellulose-based material and a polymer, and positioned in the vessel to be contacted with the feed stream.

* * * * *

UNITED STATES PATENT AND TRADEMARK OFFICE
CERTIFICATE OF CORRECTION

PATENT NO. : 8,753,524 B2  
APPLICATION NO. : 13/410420  
DATED : June 17, 2014  
INVENTOR(S) : Chad L. Felch et al.

Page 1 of 1

It is certified that error appears in the above-identified patent and that said Letters Patent is hereby corrected as shown below:

In the Specification

At column 4, line number 50, delete "for". (2nd occurrence)

At column 10, line number 67 through column 11, line 1, delete "primary".

At column 19, line number 27, delete "2" and insert --3--.

At column 25, line number 66, delete "200" and insert --300--.

At column 26, line number 19, delete "210" and insert --310--.

Signed and Sealed this  
Twelfth Day of August, 2014

Michelle K. Lee  
*Deputy Director of the United States Patent and Trademark Office*